United States Patent
Fitzgerald et al.

(10) Patent No.: US 11,973,979 B2
(45) Date of Patent: Apr. 30, 2024

(54) IMAGE COMPRESSION FOR DIGITAL REALITY

(71) Applicant: Immersive Robotics Pty Ltd, Fortitude Valley (AU)

(72) Inventors: Daniel Liam Fitzgerald, Queensland (AU); Timothy Simon Lucas, Queensland (AU); Rodney Ian Lamb, Queensland (AU)

(73) Assignee: IMMERSIVE ROBOTICS PTY LTD, Queensland (AU)

( * ) Notice: Subject to any disclaimer, the term of this patent is extended or adjusted under 35 U.S.C. 154(b) by 0 days.

(21) Appl. No.: 17/490,776

(22) Filed: Sep. 30, 2021

(65) Prior Publication Data
US 2022/0094981 A1   Mar. 24, 2022

Related U.S. Application Data

(63) Continuation of application No. 16/765,687, filed as application No. PCT/AU2018/051237 on Nov. 20, 2018, now Pat. No. 11,153,604.
(Continued)

(51) Int. Cl.
*H04N 19/597* (2014.01)
*G02B 27/00* (2006.01)
(Continued)

(52) U.S. Cl.
CPC ....... *H04N 19/597* (2014.11); *G02B 27/0093* (2013.01); *G02B 27/017* (2013.01);
(Continued)

(58) Field of Classification Search
None
See application file for complete search history.

(56) References Cited

U.S. PATENT DOCUMENTS

| 6,078,349 A | 6/2000 | Molloy |
| 6,259,991 B1 | 7/2001 | Nysen |

(Continued)

FOREIGN PATENT DOCUMENTS

| CN | 1675929 | 9/2005 |
| CN | 103096075 | 5/2013 |

(Continued)

OTHER PUBLICATIONS

Gonzalez, et al. "Digital Image Processing," Pearson Education International. Third Edition. 976 pages.
(Continued)

*Primary Examiner* — Talha M Nawaz
(74) *Attorney, Agent, or Firm* — Fish IP Law, LLP

(57) ABSTRACT

A method of displaying images forming part of a digital reality stream, the method including, for each image to be displayed in one or more encoder processing devices, generating compressed image data by differentially compressing image data indicative of the image in accordance with system operation and the content of the digital reality stream so that different parts of the image are compressed using a different degree of compression, wirelessly transmitting the compressed image data to a display device using a wireless communications link, and, in one or more decoder processing devices associated with the display device, differentially decompressing the compressed image data to thereby generate image data indicative of the image to be displayed.

19 Claims, 16 Drawing Sheets

Related U.S. Application Data

(60) Provisional application No. 62/589,379, filed on Nov. 21, 2017.

(51) Int. Cl.
    *G02B 27/01*     (2006.01)
    *G06T 9/20*     (2006.01)
    *H04N 13/344*     (2018.01)
    *H04N 19/167*     (2014.01)
    *H04N 19/48*     (2014.01)

(52) U.S. Cl.
    CPC .............. *G06T 9/20* (2013.01); *H04N 13/344* (2018.05); *H04N 19/167* (2014.11); *H04N 19/48* (2014.11)

(56) References Cited

U.S. PATENT DOCUMENTS

| | | | |
|---|---|---|---|
| 7,027,655 B2 | 4/2006 | Keeney | |
| 7,692,642 B2 | 4/2010 | Wyatt | |
| 7,904,117 B2 | 3/2011 | Doan | |
| 8,184,069 B1* | 5/2012 | Rhodes | G02B 27/017 348/115 |
| 8,369,324 B1 | 2/2013 | Breight | |
| 8,416,847 B2 | 4/2013 | Roman | |
| 8,457,026 B1 | 6/2013 | Ho | |
| 9,596,053 B1 | 3/2017 | Marupaduga | |
| 9,648,346 B2 | 5/2017 | Zhang | |
| 9,811,874 B2 | 11/2017 | Narayan | |
| 10,224,758 B2 | 3/2019 | Leabman | |
| 10,243,414 B1 | 3/2019 | Leabman | |
| 10,657,674 B2 | 5/2020 | Fitzgerald | |
| 11,153,604 B2 | 10/2021 | Fitzgerald | |
| 2001/0007575 A1 | 7/2001 | Mori | |
| 2002/0090140 A1 | 7/2002 | Thirsk | |
| 2005/0018911 A1 | 1/2005 | Deever | |
| 2005/0152450 A1 | 7/2005 | Ueno | |
| 2006/0195464 A1 | 8/2006 | Guo | |
| 2007/0037528 A1 | 2/2007 | Doan | |
| 2007/0263938 A1 | 11/2007 | Lee | |
| 2008/0055318 A1* | 3/2008 | Glen | G09G 3/20 345/501 |
| 2008/0211901 A1 | 9/2008 | Civanlar | |
| 2009/0016631 A1 | 1/2009 | Naito | |
| 2009/0033588 A1* | 2/2009 | Kajita | G02B 27/0172 345/2.3 |
| 2010/0093282 A1 | 4/2010 | Martikkala | |
| 2010/0124279 A1 | 5/2010 | Reddy | |
| 2011/0235706 A1 | 9/2011 | Demircin | |
| 2012/0121012 A1* | 5/2012 | Shiodera | H04N 19/60 375/240.03 |
| 2012/0206452 A1 | 8/2012 | Geisner | |
| 2012/0275718 A1* | 11/2012 | Takamori | H04N 19/172 382/238 |
| 2013/0040682 A1 | 2/2013 | Chang | |
| 2014/0022125 A1 | 1/2014 | Zhu | |
| 2014/0118398 A1 | 5/2014 | Hall | |
| 2014/0128032 A1 | 5/2014 | Muthukumar | |
| 2014/0184475 A1 | 7/2014 | Tantos | |
| 2014/0241428 A1* | 8/2014 | Sato | H04N 13/161 375/240.12 |
| 2014/0348438 A1 | 11/2014 | Yang | |
| 2014/0357993 A1 | 12/2014 | Hiriyannaiah | |
| 2015/0031296 A1* | 1/2015 | Holman | H04W 8/005 455/41.2 |
| 2015/0071359 A1 | 3/2015 | Guo | |
| 2015/0103183 A1 | 4/2015 | Abbott | |
| 2015/0172545 A1 | 6/2015 | Szabo | |
| 2015/0237351 A1 | 8/2015 | Lee | |
| 2016/0119646 A1 | 4/2016 | Eslami | |
| 2016/0127490 A1 | 5/2016 | Li | |
| 2016/0248995 A1* | 8/2016 | Mullins | G06V 20/20 |
| 2016/0357367 A1 | 12/2016 | Foster | |
| 2016/0360209 A1* | 12/2016 | Gosling | H04N 19/124 |
| 2016/0380692 A1 | 12/2016 | Jalali | |
| 2016/0381398 A1 | 12/2016 | Saxena | |
| 2017/0006290 A1 | 1/2017 | Osawa | |
| 2017/0069227 A1 | 3/2017 | Dialameh | |
| 2017/0075416 A1 | 3/2017 | Armstrong | |
| 2017/0085872 A1 | 3/2017 | Perron | |
| 2017/0142444 A1 | 5/2017 | Henry | |
| 2017/0236252 A1 | 8/2017 | Nguyen | |
| 2017/0285735 A1 | 10/2017 | Young | |
| 2017/0324951 A1 | 11/2017 | Raveendran | |
| 2017/0352322 A1* | 12/2017 | Spence | H04N 7/0127 |
| 2018/0054241 A1 | 2/2018 | Pi | |
| 2018/0089091 A1* | 3/2018 | Akenine-Moller | G06F 12/0207 |
| 2018/0095529 A1 | 4/2018 | Tokubo | |
| 2018/0114082 A1* | 4/2018 | Choi | G06V 10/993 |
| 2018/0146198 A1* | 5/2018 | Atluru | H04N 19/167 |
| 2019/0033058 A1 | 1/2019 | Tsurumi | |
| 2019/0089984 A1 | 3/2019 | He | |
| 2019/0141324 A1 | 5/2019 | Bjorklund | |
| 2020/0081524 A1 | 3/2020 | Schmidt | |
| 2020/0128274 A1 | 4/2020 | Rosewarne | |

FOREIGN PATENT DOCUMENTS

| | | |
|---|---|---|
| CN | 103188491 | 7/2013 |
| CN | 106688229 | 5/2017 |
| EP | 1720356 | 5/2005 |
| EP | 1892965 | 2/2008 |
| KR | 20160109066 | 9/2016 |
| WO | 2004014077 | 2/2004 |
| WO | 2012022838 | 2/2012 |
| WO | 2012177378 | 12/2012 |
| WO | 2015180663 | 12/2015 |
| WO | 2018200993 | 11/2018 |
| WO | 2019100108 | 5/2019 |
| WO | 2019100109 | 5/2019 |

OTHER PUBLICATIONS

Examination report dated Mar. 24, 2022, for related Australian application No. 2018217434. 3 pages.

Anderson, et al. "Piecewise Fourier Transformation for Picture Bandwidth Compression," IEEE Transactions on Communication Technology. vol. COM-19, No. 2, Apr. 1971. 8 pages.

Office action dated Nov. 19, 2021, from related Taiwanese application No. 107116357. 6 pages.

Taylor, Clark N.; et al. "Adaptive Image Compression for Wireless Multimedia Communication," University of California San Diego. 5 Pages.

European search report for related European application No. 18881879. 3. 10 pages.

PCT search report for related PCT application No. PCT/AU2020/051115, dated Nov. 17, 2020. 12 pages.

Examination Report from related European application No. 188805089, dated Mar. 3, 2023. 3 pages.

Gonzalez, el al. "Digital Image Processing," Pearson Prentice Hall. 36 pages.

Examination Report from related Taiwanese application No. 107141136. 7 pages.

Pecision of Rejection from related Taiwanese application No. 107141137. 4 pages.

\* cited by examiner

IMAGE COMPRESSION FOR DIGITAL REALITY

BACKGROUND OF THE INVENTION

The present invention relates to a method and apparatus for image compression or decompression for digital reality applications, and in one particular example for compressing or decompressing images to allow for transmission of the image data with a reduced bandwidth and low latency, allowing for wireless transmission of digital reality content.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

In virtual, augmented and mixed reality systems, it is typical to provide a wearable display device, such as a Head Mounted Display (HMD), which is displays information to a wearer based on the relative spatial position and/or orientation of the display device. Such systems operate by generating images based on information regarding the pose (position and orientation) of the display device, so that as the display device moves, the images are updated to reflect the new pose of the display device.

Mixed reality systems typically operate to allow real and virtual components within a field of vision to co-exist. This is typically achieved using one of two different techniques.

In a camera-to-display method, a display is placed in a user's field-of-view, between the eye and the real world scene, with this being used to display a real-world view from one or more cameras, combined with other content, such as virtual objects, text, or the like. Such approaches often leverage the camera along with other sensor data to build a feature map of the environment, to allow tracked correlation between real-world and virtual-world objects. The result is an artificially produced mixed reality with a close approximation of the real-world view via a camera, and is often used in both headset implementation as well as handheld device integration, for example using smart phones, tablets or the like. It is suitable for monoscopic viewing as well as a more human integrated stereoscopic head mounted arrangements. It also lends itself to a more virtual experience due to the artificial nature of viewing the real world through a camera, and enables varying levels of virtual scenery.

The second technique is more biased towards a real-world experience, with integration of virtual features, and typically utilises a partially transparent display to allow the real-world to be viewed. This is typically achieved using a special lens that sits between the user's eye and the real-world scene, similar in usability to that found in a pair of reading glasses. Through a waveguide, internal reflection or other optical method, light from a projector is used to display virtual features that appear in the real world. While cameras may still be used for positional tracking, they generally don't play a direct role in creating the mixed reality vision.

In order to avoid motion sickness, and to ensure that content is displayed in a correct location relative to a real-world environment, it is important that the time difference between collection of the pose information and creation of the corresponding image is minimised, particularly in circumstances where the display device is moving rapidly. This, coupled with the need to generate high resolution images so that these appear as lifelike as possible, means that significant processing hardware is required. As a result, high end existing systems typically require a static desktop computer with a high bandwidth and low latency connection to the display device. Consequently, current systems such as the HTC Vive™, Oculus Rift™ and Playstation VR™ require a wired connection between the computer and the HMD, which is inconvenient.

Whilst mobile solutions are available, such as the Gear VR™, which incorporates a mobile phone to perform the processing and display of images within the HMD itself, the processing ability is limited, meaning the content that can be displayed is restricted, particularly in terms of the image resolution and quality.

It is known to compress image data so as to reduce the data volume. This is useful in many applications, such as reduce the storage capacity required to store the image data, or to reduce bandwidth requirements associated with transmission of the image data.

JPEG uses a lossy form of compression based on the discrete cosine transform (DCT). This mathematical operation converts each frame/field of the video source from the spatial (2D) domain into the frequency domain (a.k.a. transform domain). A perceptual model based loosely on the human psychovisual system discards high-frequency information, i.e. sharp transitions in intensity, and color hue. In the transform domain information is reduced through quantization. The quantized coefficients are then sequenced and losslessly packed into an output bitstream.

However, such approaches only achieve a limited amount of compression and require significant processing time, making these unsuitable for use in low latency applications, such as virtual or augmented reality, telepresence or the like.

SUMMARY OF THE PRESENT INVENTION

In one broad form an aspect of the invention seeks to provide a method of displaying images forming part of a digital reality stream, the method including, for each image to be displayed: in one or more encoder processing devices, generating compressed image data by differentially compressing image data indicative of the image in accordance with system operation and the content of the digital reality stream so that different parts of the image are compressed using a different degree of compression; wirelessly transmitting the compressed image data to a display device using a wireless communications link; and, in one or more decoder processing devices associated with the display device, differentially decompressing the compressed image data to thereby generate image data indicative of the image to be displayed.

In one embodiment the method includes: differentially compressing the image data by discarding image data for at least some of the image; and, differentially decompressing the compressed image data by recreating image data for at least some of the image.

In one embodiment the method includes recreating image data using at least one of: image data for a corresponding part of a previous image; and, using defined image data.

In one embodiment the method includes: differentially compressing the image data in accordance with at least one of: display data at least partially indicative of at least one of: operation of the display device; use of the display device; and, communications link data indicative of operation of the wireless communications link; configuration data at least partially indicative of a configuration of the display device;

and, content data at least partially indicative of the digital reality content; and, differentially decompressing the compressed image data in accordance with at least one of: the display data; the communications link data; the configuration data; and, compression data indicative of the differential compression.

In one embodiment the method includes: determining a target compression using the communications link data; determining a relative degree of compression for each of a number of areas of interest based on at least one of: the configuration data; the display data; and, the content data; determining an absolute degree of compression for each of area of interest based on the relative degree of compression and the overall degree of compression required; and compressing the image data using the absolute degree of compression for each area of interest.

In one embodiment the method includes: determining the location of an area of interest using at least one of: the display data; and, the content data; determining the relative degree of compression for an area of interest based on the location and at least one of: content associated with the areas of interest; a configuration map defining relative degrees of compression for the display device; and, a gaze map defining relative degrees of compression for the user gaze.

In one embodiment the method includes, determining parts of the image to be discarded using at least one of: the configuration data; and, the content data.

In one embodiment the method includes: in the one or more decoder processing devices associated with the display device: generating display data by analysing signals from one or more on-board sensors; locally storing the display data; and, wirelessly transmitting the display data to the one or more encoder processing devices; in the one or more encoder processing devices: differentially compressing the image data in accordance with received display data; wirelessly transmitting the compressed image data to the display device; and, in the one or more decoder processing devices associated with the display device, decompressing received compressed image data in accordance with stored display data.

In one embodiment the image forms part of a sequence of images, and wherein the method includes using respective display data to compress and decompress at least one of: image data for a sub-sequence of one or more images; and, image data for each image.

In one embodiment the method includes selectively transmitting the display data in accordance with at least one of: operation of the wireless communications link; and, a compressed image data bandwidth.

In one embodiment the display data is indicative of at least one of: pose data indicative of a display device pose relative to the environment; movement data indicative of a display device movement relative to the environment; input commands provided by a user; gaze data indicative of a user gaze; and, physiological data indicative of a physiological attribute of the user.

In one embodiment the sensors include at least one of: image sensors; range sensors; position sensors; orientation sensors; movement sensors; eye tracking sensors; muscle tracking sensors; and, physiological sensors.

In one embodiment the method includes generating at least one of pose and movement data using a simultaneous localisation and mapping algorithm.

In one embodiment the pose data includes an indication of a position of a number of points in an environment relative to the display device.

In one embodiment the method includes: determining a change in display device pose from display of a previous image using at least one of: movement data; and, pose data and previous pose data; and, using the change in display device pose to at least one of: compress image data; and, decompress the compressed image data.

In one embodiment the method includes: retrieving previous image data for a previous image; determining redundancy between the image and the previous image; and, using the redundancy to at least one of: compress image data; and, decompress the compressed image data.

In one embodiment the method includes: determining a user gaze including at least one of: a direction of gaze; and, a depth of gaze; using the user gaze to at least one of: compress image data; and, decompress the compressed image data.

In one embodiment the method includes using a depth of field of part of the image and the depth of gaze to at least one of: compress image data for the part of the image; and, decompress the compressed image data for the part of the image.

In one embodiment the method includes: in the one or more encoder processing devices: differentially compressing the image data in accordance with content data; generating compression data indicative of the differential compression; wirelessly transmitting the compression data to the display device; and, in the one or more decoder processing devices associated with the display device decompressing the compressed image data in accordance with the compression data to thereby generate the image to be displayed.

In one embodiment the method includes: using the content data to select a compression scheme; and, differentially compressing the image data using the compression scheme.

In one embodiment the method includes determining the content data by at least one of: receiving content data from a content engine; and, analysing a low resolution image.

In one embodiment the content data includes at least one of: pixel array content; image content; content of different parts of the image; an opacity of different parts of the image; areas of interest within the image; locations of interest within the image; one or more cues associated with the image; and, one or more display objects within the image.

In one embodiment the compression data includes at least one of: boundary data indicative of a boundary encompassing one or more display objects; block data indicative of a block of pixel arrays; opacity data indicative of an opacity of different parts of the image; and, location markers indicative of a location of interest.

In one embodiment the method includes: in the one or more encoder processing devices: generating a boundary; differentially compressing the image data in accordance with the boundary; generating boundary data indicative of the boundary; wirelessly transmitting the boundary data to the display device; and, in the one or more decoder processing devices associated with the display device decompressing the compressed image data in accordance with the boundary data to thereby generate the image to be displayed.

In one embodiment the method includes, for each boundary: in the one or more encoder processing devices: selecting a respective compression scheme to compress image data within the boundary; and, generating the boundary data in accordance with the selected compression scheme; and, in the one or more decoder processing devices associated with the display device: determining the selected compression scheme in accordance with the boundary data; and, using a corresponding decompression scheme to decompress the compressed image data.

In one embodiment the boundary data is indicative of at least one of: a boundary extent, including at least one of: one or more boundary vertices; a boundary shape; and, a boundary location; a change in boundary extent compared to a previous boundary for a previous image; and, an indication that an estimated boundary should be used.

In one embodiment the method includes, in the one or more encoder processing devices, generating a boundary by at least one of: calculating a boundary using the content data; and, estimating a change in boundary using the display data.

In one embodiment the method includes, in the one or more encoder processing devices, calculating a boundary by: identifying one or more parts the image from the content data; calculating at least one boundary encompassing the one or more parts.

In one embodiment the one or more parts encompass one or more display objects within the image.

In one embodiment the method includes calculating the boundary so that the number of bits required to encode the boundary and encoded image data are minimised.

In one embodiment the method includes: in the one or more encoder processing devices: retrieving previous boundary data indicative of a previous boundary for a previous image; determining a change in boundary extent using the previous boundary data; and, generating the boundary data using the change in boundary extent; and, in the one or more decoder processing devices: retrieving previous boundary data indicative of a previous boundary for a previous image; determining a change in boundary from the boundary data; and, using the previous boundary and the change in boundary extent to calculate a boundary extent.

In one embodiment the method includes, in the one or more encoder processing devices: for every $n^{th}$ image in a sequence of images, assessing an estimated boundary using at least one of: a calculated boundary; and, the content data; selectively re-calculating a boundary depending on results of the comparison.

In one embodiment the method includes, in the one or more decoder processing devices associated with the display device: determining an estimated boundary is to be used from the boundary data; and, estimating a boundary using the display data.

In one embodiment the method includes estimating a boundary using at least one of: a change in display device pose; and, a field of view change.

In one embodiment the method includes: in the one or more encoder processing devices, compressing at least part of the image data by: obtaining pixel data from the image data, the pixel data representing pixel arrays from within an image; identifying a pixel block including a number of pixel arrays having a substantially similar pixel array content; generating compression data including block data indicative of: a first pixel array location; an end pixel array location; and, the pixel array content; and, in the one or more decoder processing devices associated with the display device, decompressing at least part of the compressed image data by: determining from block data: a first pixel array location; an end pixel array location; and, pixel array content. generating a pixel block including a number of pixel arrays having a substantially similar pixel array content using the block parameters; and, generating image data at least in part using the pixel block.

In one embodiment the method includes determining the configuration data indicative of a display device configuration by at least one of: retrieving the configuration data using a display device identifier; and, wirelessly exchanging the configuration data between the display device and one or more encoder processing devices.

In one embodiment the one or more decoder processing devices associated with the display device configuration include at least one of: a display resolution; a display refresh rate; a display field of view; and, display lens attributes.

In one embodiment the method includes determining communications link data indicative of operation of a wireless communications link at least one of: from wireless communications link hardware; in the one or more decoder processing devices associated with the display device and one or more encoder processing devices independently; and, by exchanging the communications link data between the display device and one or more encoder processing devices.

In one embodiment the communications link data is indicative of at least one of: a wireless communications link error metrics; a wireless communications link quality of service; a wireless communications link bandwidth; and, a wireless communications link latency.

In one embodiment the method includes differentially compressing the image data by: obtaining pixel data from the image data, the pixel data representing an array of pixels within the image; determining a position of the array of pixels within the image; and compressing the pixel data at least partially in accordance the determined position so that a degree of compression depends on the determined position of the array of pixels.

In one embodiment the method includes compressing the pixel data so that the degree of compression is based on at least one of: a user gaze; and, display device configuration.

In one embodiment the method includes: compressing the image data by: obtaining pixel data from the image data, the pixel data representing an array of pixels within the image; applying a transformation to the pixel data to determine a set of frequency coefficients indicative of frequency components of the array of pixels; selectively encoding at least some of the frequency coefficients using a bit encoding scheme to thereby generate a set of encoded frequency coefficients; and, generating the compressed image data using the encoded frequency coefficients; and, decompressing the compressed image data by: determining a set of encoded frequency coefficients from the compressed image data in accordance with the bit encoding scheme; performing bit decoding of the encoded frequency coefficients in accordance with the bit encoding scheme to thereby generate a set of frequency coefficients; and, applying an inverse transformation to the set of frequency coefficients to determine pixel data representing an array of pixels within the one or more images.

In one embodiment the bit encoding scheme defines the number of bits used to encode each of the frequency coefficients, and wherein the frequency coefficients are selectively encoded so that at least one of: frequency coefficients having a higher magnitude are encoded; at least some of the encoded frequency coefficients have different numbers of bits; a smaller number of bits are used to encode frequency coefficients corresponding to higher frequencies; a progressively smaller number of bits are used to encode frequency coefficients corresponding to progressively higher frequencies; at least one frequency coefficient is discarded so that the set of encoded frequency coefficients is smaller than the set of frequency coefficients; and, at least one frequency coefficient is discarded corresponding to higher frequencies.

In one embodiment the method includes selecting frequency coefficients having progressively smaller numbers of bits until one or more encoding parameters are met.

In one embodiment the method includes: in the one or more encoder processing devices, generating an index indicative of the encoded frequency coefficients; and, in the one or more decoder processing devices associated with the display device, decompressing the compressed image data using the index.

In one embodiment the index is indicative of: a number of bits of each encoded frequency coefficient; and, a location, the location being at least one of: a location of each encoded frequency coefficient in a defined sequence; and, a location of each encoded frequency coefficient within the coefficient matrix.

In one embodiment the method includes selecting a bit encoding scheme based on a required degree of compression.

In one embodiment the method includes: compressing different parts of the image using different ones of a plurality of compression schemes; and, decompressing the compressed image data by using corresponding decompression schemes for the different parts of the image.

In one embodiment the plurality of compression schemes include at least one of: compression schemes using different types of compression; and, compression schemes using different compression parameters.

In one embodiment the method includes selecting a compression scheme based on a required degree of compression.

In one broad form an aspect of the invention seeks to provide a system for displaying images forming part of a digital reality stream, the system including: one or more encoder processing devices that generate compressed image data by differentially compressing image data indicative of the image in accordance with system operation and the content of the digital reality stream so that different parts of the image are compressed using a different degree of compression; a wireless communications link that wirelessly transmits the compressed image data; and, one or more decoder processing devices associated with a display device that decompress the compressed image data to thereby generate image data indicative of the image to be displayed.

In one embodiment the display device includes: a wireless transceiver; a display; and, one or more sensors.

In one embodiment the sensors includes at least one of: image sensors; range sensors; position sensors; orientation sensors; movement sensors; eye tracking sensors; and, physiological sensors.

In one embodiment at least one of the display device and an encoder include a memory that stores at least one of: configuration data indicative of a display device configuration; boundary data indicative of a defined boundary associated with the display device; previous boundary data indicative of a previous boundary for a previous image; previous pose data indicative of a previous display device pose; and, previous image data indicative of a previous image.

In one embodiment the display device includes: a decoder input buffer that receives the compressed image data; and, a decoder output buffer that stores the image data.

In one embodiment the one or more decoder processing devices include at least one of: a suitably programmed field programmable gate array; an Application-Specific Integrated Circuit; and, a Graphics Processing Unit.

In one embodiment the one or more encoder processing devices form part of an encoder including: an encoder input buffer that receives the image data; and, an encoder output buffer that stores compressed image data.

In one embodiment the encoder includes an encoder transmitter that transmits the image data from the encoder output buffer.

In one embodiment the encoder processing devices include: a suitably programmed field programmable gate array; an Application-Specific Integrated Circuit; and, a Graphics Processing Unit.

In one embodiment the system includes a decoder in wireless communication with an encoder to exchange at least one of: compressed image data; display data at least partially indicative of at least one of: operation of the display device; use of the display device; and, communications link data indicative of operation of the wireless communications link; configuration data at least partially indicative of a configuration of the display device; and, content data at least partially indicative of the digital reality content; and, compression data indicative of the differential compression.

In one embodiment the decoder is at least one of: coupled to a wearable display device; part of a wearable display device; and, an embedded system within a client device.

In one embodiment the encoder is at least one of coupled to and part of a suitably programmed computer system.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Various example embodiments of the present invention will now be described with reference to the accompanying drawings, in which:—

DETAILED DESCRIPTION OF THE PREFERRED EMBODIMENTS

Examples of methods of compressing and decompressing image data for use in digital reality applications will now be described.

For the purpose of illustration, it is assumed that the process is performed at least in part using one or more electronic processing devices, typically forming part of a computer system or similar, in communication with a display device, such as a head mounted display, typically via a wireless connection. In a preferred example, an encoder processing device is provided for use in, with, or as part of the computer system(s) that are responsible for providing image data, whilst one or more decoder processing devices are provided for use in, with, or as part of an HMD that is used to display digital reality content to a user. It will be appreciated however that other alternative arrangements could be used.

The image data typically represents one or more images forming part of a sequence of images, which in one example is a digital content stream displayed remotely using the HMD. The digital content stream typically forms part of an augmented or mixed reality application, in which image content is displayed in conjunction with the user's environment, for example by displaying images on a transparent screen and/or by combining the images with images of the environment. However, it will be appreciated that some of the techniques described herein are also applicable to virtual reality and/or telepresence applications, and the term digital reality is therefore not intended to be limiting. Specifically the term digital reality is intended to encompass at least a mixed real and virtual reality application, commonly referred to as mixed or merged reality, including arrangements that merely overlay virtual objects into a user's field-of-view or provides virtual features that are strongly intertwined with, and appear to co-exist with the real-world features, but can also be extended to augmented and pure virtual reality applications.

Figure 1A:
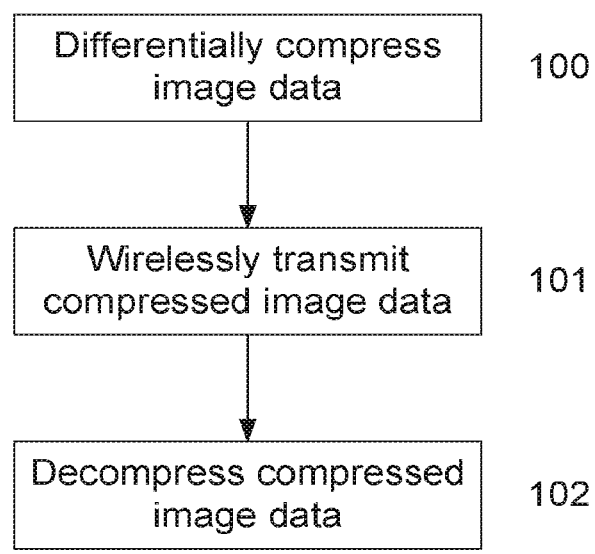
FIG. 1A is a flowchart of an example of a method of compressing and decompressing image data for use in a digital reality application.

A first example process for compressing and decompressing image data using will now be described with reference to FIG. 1A.

In this example, at step 100 one or more encoder processing devices generate compressed image data by differentially compressing image data indicative of the image to be displayed. This is performed in accordance with system operation and the content of the digital reality stream, so that different parts of the image are compressed using a different degree of compression, thereby optimising the amount of overall compression achieved, whilst reducing the impact on perceived image quality.

At step 101 the compressed image data is wirelessly transmitted to a display device, such as a wearable HMD. The transmission is typically performed via a suitable wireless communications channels, which could include a dedicated communications channel, Wi-Fi, or other 802.11 networks, mobile phone networks, such as 3G, 4G or 5G networks, or the like.

Upon receipt, one or more decoder processing devices associated with the display device then differentially decompress the compressed image data at step 102, thereby generating image data indicative of the image to be displayed. In this regard, the decompressed image data can be provided to a display engine of the display device, allowing this to be displayed in the normal way.

Accordingly, the above described approach uses a combination of system operation and the content, so that compression of each image is tailored to current system operation and current content, thereby optimising the compression process for each image, thereby helping to ensure that bandwidth and latency requirements are met.

For example, in the event that the quality of the wireless communications link reduces, for example due to interference, more aggressive compression is performed, in order to reduce the overall size of the image data associated with each image, thereby ensuring wireless transmission of the images is not interrupted. Similarly, the compression used can vary depending on movement of the headset, characteristics of the headset, or the like and additional examples will be described below.

To achieve this, different compression techniques are used either independently or in parallel, with these being selected dynamically as needed, to ensure the desired degree of compression is achieved.

For example, one compression technique includes discarding image data for at least some of the image and then differentially decompressing the compressed image data by recreating image data for at least some of the image. In this regard, discarding parts of the image so that these do not need to be transmitted can result in significant overall compression, without adversely effecting remaining parts of the image.

The parts of the image that are discarded can be recreated from a corresponding part of a previous image, with redundancy between successive images, calculated taking into account headset movement, allowing image detail to be recreated without requiring that image data is transmitted. Accordingly, by analysing movement of the headset and changes in content between successive frames, this can result in a large reduction in image data volume, with no or minimal loss in image quality. For example, if the user is moving translationally in relation to a Virtual Feature, it is feasible that a few frames could be horizontally or vertically shifted on the decompression side, without requiring a new frame to be transmitted.

Additionally, in the case of mixed reality applications, large portions of the generated are not in practice displayed, and are included solely for the purpose of ensuring displayed parts of the image are shown in the correct location. Specifically, these parts are either not displayed in the case when the headset includes a partially transparent display, or are replaced with feeds from a camera in the headset, in the case of camera-to-display methods. In order to provide for interoperability with different hardware, such regions are often generated as black pixels in the image, with the headset operating to either omit or replace the black pixels when displaying the final mixed reality image. Accordingly, in another example, the display device can be adapted to recreate omitted parts of the image, using defined image data, such as black pixels, before the image is passed to the display engine, which then interprets this in the normal manner, omitting or replacing the black pixels.

In another example, the areas to be omitted are defined by an opacity, typically in the form of an alpha channel, provided in conjunction with more typically RGB image data. Accordingly, in another example, compression could be performed using the alpha channel and RGB channels, with the reconstructed alpha channel being used to locate areas of interest/objects in the RGB channel, thereby controlling where these are presented in the final image.

In addition to remove parts of the image, the compression technique can compress remaining parts of the image using one or more different compression techniques. This can include using known compression approaches, such as JPEG, or the like, with the degree of compression being controlled by adjusting parameters of the compression algorithm. Other additional compression techniques that can be used include block encoding, DCT and associated bit encoding schemes, or the like, and additional examples will be described in more detail below.

Typically the system is adapted to control the compression process based on a range of data relating to different aspects of the system operation and/or the content.

For example, the compression process can take into account display data that is at least partially indicative of operation of the display device and/or use of the display device, communications link data indicative of operation of the wireless communications link, configuration data at least partially indicative of a configuration of the display device and content data at least partially indicative of the digital reality content.

The display data can define a current display device pose and/or movement, which can be used to assess redundancy compared to previous images, or a user gaze which can assess which areas of the image are being focused on by the user, and hence which require greater image quality. Similar the content data can be used to determine areas of interest within the image, for example based on visual content, and/or other contextual cues, such as audible cues, again allowing areas requiring greater image quality to be ascertained. The configuration data typically defines parts of the image that are either out of the field of view of the display device, and hence not displayed, and/or are in region of the image that is not displayed as well, and hence can use more aggressive compression without a perceived reduction in image quality. Finally, the communications link data can be used to control an overall degree of compression used, based on current bandwidth and/or latency, ensuring the compressed image data can be transmitted in a timely fashion.

When compression is performed using display data, communications link data and/or configuration data, as this information can be known by the headset, this allows the decoder processing device(s) to use the same data, including the display data, communications link data and/or configuration data when performing the decompression. Additionally, in the event that compression is based on content data, then the decoder processing device may additionally use compression data indicative of the differential compression, which can be provided by the encoder processing device as part of or with the compressed image data. In either case, the data can be used to establish the compression that was used for different parts of the image, and then use this to implement an appropriate corresponding decompression scheme. For example, this can be used to allow the decoder processing device(s) to recreate omitted parts of the image, and use the correct decompression technique, when decompressing compressed parts of the image.

Particularly in the case of using display data, as well as communications link data and/or configuration data, these can be known to both the display device and processing devices as part of normal system operation and hence do not require additional transfer of data between the processing device(s) and display devices, which in turn reduces bandwidth requirements, allowing more bandwidth to be dedicated to transfer of the compressed image data.

In one example, multiple factors are taken into account in combination when implementing the compression process. For example, the encoder processing device(s) can determine a target compression using the communications link data, in particular using the overall bandwidth, and/or communications link latency to assess the amount of compressed image data that can be used for each compressed image without introducing bottlenecks in the transmission process.

Having determined the target compression, the encoder processing device(s) then determine a relative degree of compression for each of a number of areas of interest based on the configuration data, the display data and/or the content data. Thus, this will assess for different areas of interest, the amount of compression that can be used, optionally taking into account device configuration, user gaze, content of the area of interest, other contextual cues, or the like. For example, this can be achieved by determining a location of an area of interest using the display data and/or the content data, and then determining the relative degree of compression based on the location and either the content associated with the area, a configuration map defining relative degrees of compression for the display device or a gaze map defining relative degrees of compression for the user gaze. Examples of this will be described in more detail below.

Once a relative degree of compression has been determined for each area of interest, an absolute degree of compression can then be calculated for each of area of interest based on the relative degree of compression and the overall degree of compression required, allowing each area of interest to be compressed, using an appropriate technique. Thus the determined degree of compression can be used to select a compression scheme and/or select parameters for a compression scheme. In general multiple different compression schemes and/or parameters are used, thereby allowing differential compression to be achieved for different parts of the image.

Further features of the different approaches will now be described separately, before a more in-depth example, using a combination of approaches, is described in more detail.

Figure 1B:
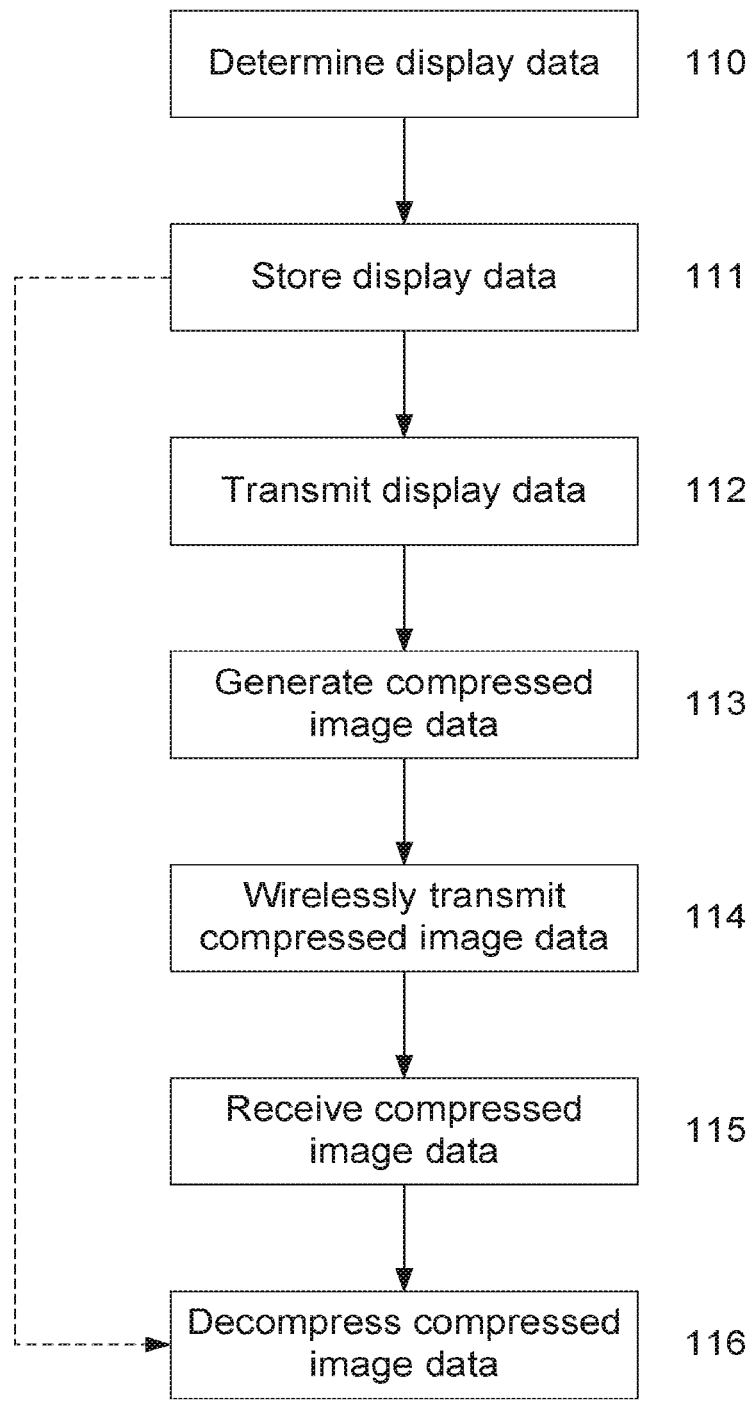
FIG. 1B is a flowchart of an example of a method of compressing and decompressing image data for use in a digital reality application based display data.

An example of the process of performing compression/decompression using display data will now be described with reference to FIG. 1B.

In this example, at step 110 a display device analyses signals from one or more sensors, using this to generate display data. As previously mentioned, the display data relates to some aspect of display device operation and/or use, and could include any one or more of pose data indicative of a display device pose relative to the environment, movement data indicative of a display device movement relative to the environment, input commands provided by a user, gaze data indicative of a user gaze and/or physiological data indicative of a physiological attribute of the user. What each of these data have in common is that these can be measured in real-time using on-board sensors based on the display device and/or sensors in communication with the display device, allowing this information to be transferred from the display device to the encoder processing systems and taken into account to optimise the compression process.

It will be appreciated from this that nature of the sensors and the analysis that is performed will vary depending upon the preferred implementation. For example, when determining pose and/or movement, the sensors could include location and orientation sensors, such as a combination of a positioning system, such as GPS, and orientation sensors, such as accelerometers. However, in one preferred example, the sensors include image or range sensors which are used to calculate pose data utilising a simultaneous localisation and mapping (SLAM) algorithm. Other example sensors that can be used, include eye tracking sensors, and in particular pupil or muscle sensors, and/or other physiological sensors, for example for sensing electrical activity in muscles and/or the brain.

At step 111, the display data is stored locally in the headset, before being transmitted from the display device to the one or more processing devices at step 112, typically using the same communications link that is used for transmitting the compressed image data.

At step 113 the encoder processing device(s) generate compressed image data, at least in part using the display data. The nature of the compression and the manner in which this is performed will vary depending on the preferred implementation and could include the use of existing compression techniques, as well as one or more of the compression techniques described herein.

Once generated, the compressed image data is wirelessly transmitted to the display device at step 114. The compressed image data is received by the display device at step 115, allowing the compressed image data to be decoded at step 116. The manner in which this is achieved will vary depending upon which the manner in which the compressed image data, and again examples will be described in more detail below.

Once decoded, this allows the image to be displayed by the display device, using a suitable display system, such as a screen, waveguide projection arrangement, or the like.

Accordingly, the above described process operates by determining display data from on-board sensors, which is then wirelessly transmitted to processing devices, allowing the processing devices to use the display data when generating compressed image data. The compressed image data can then be returned to the display device wirelessly, allowing this to be decompressed using the locally stored display data. This allows the encoder and decoder processing devices to use the same information in the form of the display data, when performing the compression and decompression processes. This can allow suitable compression and corresponding decompression schemes to be selected locally, in the encoder and decoder processing devices, avoiding the need to exchange further information regarding the compression scheme used, in order to allow decompression to be performed. Furthermore, this allows current operation and use of the display device to be taken into account when performing the compression, thereby allowing this to be optimised based on the current circumstances. For example, the degree of movement can be used to adjust compression levels, so that if a user moves quickly, and the Virtual Feature is distant, then a much higher level of compression can be applied, whereas if a user is still and close to an object, a reduced amount of compression could be used, potentially with a trade-off in frame rate.

These features make it feasible for digital reality images to be generated by a processing device that is in wireless communication with the display device, without resulting in excessive bandwidth requirements or latencies. In one particular example, this enables remote serving of digital reality images to be achieved from cloud based computing, with the resulting images being displayed on a display device after transmission via a mobile communications network, such as a mobile phone network or similar, although this is not essential and other wireless communications systems, such as WiFi or the like, could be used.

A number of further features will now be described.

In one example, the method includes selectively transmitting the display data in accordance with operation of the wireless communications link and/or a compressed image data bandwidth. Thus, the system can take into account an available bandwidth and size of the compressed image data, selecting whether or not to transmit the display data. It will be appreciated that where available, respective display data is typically used when compressing and decompressing each image, so that each image is optimally compressed and decompressed, based on the current operation of the display device. However, if display data is not transmitted, then the same display data could be used for a sub-sequence of images from the digital reality stream, for example compressing and decompressing a sequence of a few images, using the same display data.

In one example the sensors include either image or range sensors with the method including generating pose data using a SLAM algorithm. In this instance, the pose data can be calculated on board the headset, for example using a locally implemented SLAM algorithm, which is contrasted with traditional techniques in which either the processing device calculates the pose data by having the display device transfer an indication of the sensor signals to the processing devices, or in which the image data is created on the display device itself. For example, the pose data could include an indication of a position of a number of sensed points in an environment relative to the display device.

Thus, the on-board calculation of pose data can minimise the amount of data that needs to be transferred from the display device in order to allow the compressed image data to be created. In particular this avoids the need to transfer sensor signals, such as images captured using imaging devices mounted on-board the display device, which takes up significant bandwidth and can introduce bandwidth restrictions on the transfer of image data, or can introduce latency into the system. It will be appreciated however that this is not essential and alternatively, other sensing arrangements could be used, such as sensing the position of the display device relative to beacons or other similar arrangements.

As described above, the compressed image data can be created based on the pose and/or movement data, so that the compression can be optimised taking into account display device pose and/or movement, thereby optimising the compression achieved. In one example, the method includes determining a change in display device pose based on either movement data and/or pose data and previous pose data, and then using the change in display device pose to either generate compressed image data or decompress the compressed image data. In particular, this process utilises changes in display device pose between successive images in order to optimise the compression/decompression process. In particular, this relies on the fact that as the display device moves, a position of objects within the images will also move, with an understanding of this movement allowing increases in efficiency to be achieved.

In one particular example, this is achieved by determining redundancy between subsequent images. Specifically, the method can include compressing the image data by retrieving previous image data from a previous image, determining redundancy between the image and previous image and then using the redundancy to compress the image data. Similarly, when decompressing images the method includes in the display device, retrieving previous image data for a previous image, determining redundancy between the image and previous image and using the redundancy to decompress the image data. Thus, previous images can be stored by both the processing devices and display devices and used in order to reduce the magnitude of data that needs to be transferred.

For example, the appearance of individual objects within an image may be unchanged between successive images, with only the position varying based on movement of the display device. Accordingly, in this example, it is possible to simply replace portions of an image with part of previous image. The display device can then retrieve image data from the previous image and substitute this into the current image, vastly reducing the amount of image data that needs to be transferred without resulting in any loss in information. This could be calculated based on the display device movement, and/or could be achieved through code substitution, for example by replacing part of an image with a reference to part of a previous image, with the reference being transmitted as part of the image data. The reference could be of any appropriate form, but in one example is a code or similar that refers to a region within the earlier image. This could include a specific region of pixels, such as one or more pixel arrays, or could refer to a region defined by a boundary, as will become apparent from the remaining description.

Knowledge of movement of the user can also be used to adjust a frame rate, reducing a frame rate by omitting frames, allowing for reduced compression to be used in scenarios where there is less movement, for example if the user is viewing a close object and is relatively still. When the user begins to apply acceleration, the encoding scheme can adjust to an aggressive compression and a higher frame-rate combination, to provide a lower latency and a more persistent experience.

Movement of the display device can also be used in estimating positions of boundaries that act as masks for the culling of image data, as will be described in more detail below.

The display data could also or alternatively gaze data indicative of the user gaze, including a direction and/or depth of gaze. This can be determined utilising any appropriate technique, such as tracking a user's pupils, or eye muscles, with a direction of gaze of each of the user's eyes being tracked independently in order to determine gaze depth. As such eye tracking sensing arrangements and their operation are known and these will not therefore be described in any further detail.

The encoder processing devices then compress image data based on the gaze, for example by providing a different degree of compression for different objects or areas within the image based on their position and the gaze of the user. For example, this can be performed so that reduced compression, and hence better quality is used for image objects nearer the user's point of gaze, whereas greater compression is used for objects away from the user's gaze. In this regard, a user will typically focus less on objects away from their point of gaze, and hence will not perceive a reduction in image quality to the extent that they would if the object is closer to the point of gaze. Thus, this allows objects further from the point of gaze to be encoded using greater compression without a noticeable reduction in image quality. It will be appreciated that the point of gaze can include the gaze depth, as well as the 2D position on the image, meaning the degree of compression can vary depending on the depth of field of the image content, versus the depth of gaze of the user.

Once generated, compressed image data can be wirelessly transferred to the display device, allowing the decoder processing device(s) of the display device to decompress the compressed image data. Again, decoding can be performed based on the gaze data. In this regard, it will be appreciated that as the display device has access to the same gaze data, and hence can use a similar assessment technique to the processing device(s) in order to determine the compression and hence the compression algorithm that should be used. This allows the image data to be successfully recreated, without requiring information regarding the encoding algorithms used to be transferred from the processing device(s) to the display device.

Accordingly, the above described process utilises gaze data both during the compression and decompression stages allowing differential compression to be performed for different image objects and without requiring that knowledge regarding the compression process used be transferred to the display device, in turn reducing data bandwidth requirements.

While eye position can be updated dynamically with active eye tracking, passive statistical gaze prediction or even using AI algorithms or EEG input (measuring brain neural activity to dynamically estimate gaze direction), can also be used as an indicator of gaze direction. For example, neural sensors could be used in conjunction with more traditional sensors to assist in more precise tracking and eliminate error and false positives.

This could be extended to include sensors placed on or within the body to sense electrical activity in muscles, to reduce latency in future motion estimation, particularly of neck and head movement. In this example, it is possible to estimate a muscles future action from early electrical or physiological ques, such as fast twitch movement, before it has fully translated into mechanical movement or full extension of the muscle.

A system like this can be deployed in parallel to read neurological responses to content viewed. It could also be used for data mining and or to create improved interaction based on neural responses and neural mapping. Another complimentary application could be to use neurological sensing, to estimate and read facial expression, which can be transmitted to an avatar representation, which is particularly beneficial for interaction applications and telepresence.

A learning algorithm can be incorporated in a system of this form, with a defined combination of movements being used for calibration to help eliminate false positives.

The system could also utilise muscle movement more broadly, for example to anticipate movement of the display device, to allow for a translational image shift or warp to be computed on the HMD very quickly, without needing to render or receive a new frame, which would improve latency in fast, small "twitchy" head movements. Offering greater image persistence over a network with small bandwidth budget. A system like this would work in parallel with the HMD's other sensors to eliminate false positives.

A neural implant solution would naturally be less susceptible to false positives from aberrant electrical activity in the body, and whilst seemingly invasive, these could have particular applications for disabled people to better experience VR, MR, or future advancements in things like neural lace and other implants, could gain popularity as a computer interface, for the common user.

Figure 1C:
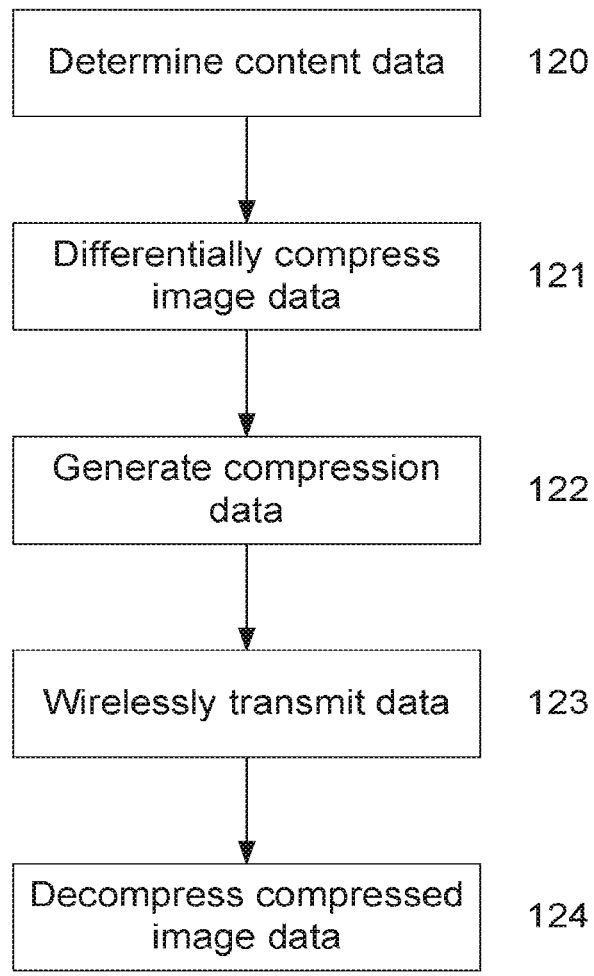
FIG. 1C is a flowchart of an example of a method of compressing and decompressing image data for use in a digital reality application based on digital reality content.

An example of a process for encoding images using content of the digital reality stream will now be described with reference to FIG. 1C.

In this example, at step 120 the encoder processing devices determine content data. The content data can relate to any aspect of the content, and could include pixel array content, image content, content of different parts of the image, an opacity of different parts of the image, areas of interest within the image, locations of interest within the image, one or more cues associated with the image, such as audible or contextual cues, or one or more display objects in an image. The content data can be determined in any appropriate manner and this could involve performing image analysis, for example of a low resolution image or could involve receiving information content regarding the objects, such as a shape and location of the objects, from a content engine, thereby avoiding the need to perform image analysis, in turn reducing computation requirements and increasing speed. As described in more detail below, the content data could also include profiles or the like, which at least partially govern the compression that is performed. The content data could additionally and/or alternatively include a scene map, specifying the location of objects or other areas of interest, the location of contextual clues, or the like, which can again be used to assist the compression process.

At step 121, the content data is used when differentially compressing the image data. This can be achieved in any appropriate manner, but in one example, involves determining a boundary encompassing the one or more areas or interest, such as one or more objects, within the image. Alternatively, this can involve identify and replacing blocks of pixels within the image, or identifying areas of the image have a low opacity and then using more aggressive compression or omitting lower opacity areas, which tend to have less visual impact on the user.

At step 122 compression data indicative of the differential compression is created. The compression data could include boundary data could be one or more parameters which specify an extent of the boundary, could be an indication that an estimated boundary is to be used, or could be an indication of a change in boundary. Alternatively, this could include block data indicative of a block of pixel arrays, opacity data indicative of an opacity of different parts of the image or location markers indicative of a location of interest.

At step 123, compressed image data and the compression data is transmitted to the display device, allowing this to be used in reconstructing the image.

In this example, the compression therefore uses information regarding the content of the digital reality stream in order to optimise the compression process. This can take into account image data which can be omitted, for example if it falls outside of a boundary, is below an opacity threshold, or is replaced by a block code, which can result in a significant reduction in volume of the data, irrespective of whether or not the remaining image data is compressed or not.

As mentioned, in one example, the encoder processing devices operate to generate one or more boundaries based on the content, and then differentially compress the image data based on the boundaries. The boundaries can be determined in any appropriate manner and could be estimated based on a previous boundary, calculated based on a location and extent of an area of interest, identified objects, or the like. The boundary typically encompasses the area and/or objects and is used to define a mask thereby designating portions of the image which need to be encoded and those which can be omitted. It will be appreciated that if multiple objects are provided separately within the image, a single boundary can be defined encompassing all the objects, or multiple boundaries could be defined, each encompassing one or more objects. Reference to a boundary is therefore intended to cover the use of multiple separate boundaries.

The encoding of image data within the boundary could be performed in any suitable manner and could include retaining the image data for parts of the image within the boundary without change, but more typically includes some form of lossy or lossless compression, such as code substitution, JPEG compression, bit encoding, or the like. A further variation is for the content of a boundary to be replaced by content from a previous image based on redundancy between images. For example if a boundary surrounds an object that is static, the image data within the entire boundary can simply be omitted from the compressed image data, and substituted with image data from a previous image.

Once a boundary is generated, boundary data indicative of the boundary is created. The boundary data could be one or more parameters which specify an extent of the boundary, could be an indication that an estimated boundary is to be used, or could be an indication of a change in boundary.

The compressed image data and boundary data can then be transmitted to the display device. In this particular instance, the compressed image data simply omits (masks) image data falling outside of the boundary, thereby resulting in a significant reduction in volume of the data, irrespective of whether or not the image data within the boundary is compressed or not.

The decoder processing device associated with the display device can then determine boundary data and encoded image data from the received compressed image data, typically by parsing the compressed image data and retrieving the boundary data. The encoded image data is decoded utilising a suitable decoding scheme, with the manner in which this is performed being dependent on the encoding scheme used to encode the image data. For example a respective compression scheme used to compress image data within the boundary can be identified in the boundary data. Alternatively, the decoder processing device might determine the compression scheme used based on the display data, configuration data and/or communications link data. In either case, the decompression process uses a corresponding decompression scheme to decompress the compressed image data.

The image can then be displayed in accordance with the boundary and the decoded image data. In particular, this is typically achieved by displaying images of areas of interest based on the decoded image data, with the location of the images being defined by the boundary, in effect recreating the original image. In this regard, masked portions of the original image falling outside of the boundary can simply be recreated, replaced, or not displayed, depending on the application. For example, in mixed or augmented reality applications, masked parts of the image are not displayed to allow the user's external environment to be viewed. Specifically, these are either omitted, allowing the user to view the environment directly, or are replaced by captured images of the environment. To achieve this traditional systems code pixels that aren't to be displayed as black pixels, with the display system either not displaying black pixels, or replacing these with captured environment images. Thus in this instance, masked areas of the image can be replaced by black pixels, so existing display systems can correctly interpret the images, although it will be appreciated that other arrangements can be used.

Accordingly, the above described process effectively compresses the image by masking out parts of the image that are not displayed in a mixed or augmented reality application to thereby allow the user to view their surrounding environment. As augmented or mixed reality applications tend to show only small areas of image so that the user can maintain a view of their local environment, this can result in significant reductions in volume of image data that needs to be transmitted, thereby achieving significant compression, even if image data associated with the objects is not itself compressed. Nevertheless, the resulting image can be displayed accurately, based on knowledge of the boundary which can in effect be used to recreate parts of the image outside of the boundary, or correctly position the parts of the image within the boundary.

In general the boundary data is configured to minimise the data required to define the boundary. This can be achieved through a combination of mechanisms, including through suitable selection of a boundary shape, or by tracking or estimating changes in boundary between successive images.

In one example, the boundary data is indicative of a boundary extent including boundary vertices, a boundary shape and/or location. This can be of any appropriate form but is typically selected to allow the data required to define boundary to be minimised, for example by basing the boundary shape on a polygon so the boundary can be defined by vertices of the polygon. It will be appreciated however that any appropriate boundary shape could be used, in which case this could be defined in other ways. For example, in the case that the boundary is a circle, this could be defined by a radius and circle centre, whilst a square could be defined by two opposing corners. Alternatively, the boundary data could be indicative of a change in boundary, including a change in shape and/or position, or could be an indication that an estimated should be calculated by the decoder processing device, avoiding the need to transmit detailed boundary data.

The boundary shape and extent is typically calculated in order to ensure objects and/or areas of interest within the image are encompassed. When compressing an image, the processing device typically receives image data defining the image from a content engine. Whilst this could be analysed to determine the location and/or shape of objects, more typically the processing devices can receive an indication of a display object extent of each display object from the content engine. This allows the boundary extent to be calculated using the object extent of each display object. This is feasible as the content engine will have knowledge regarding the object shapes and locations, which in turn avoids the need for the processing devices to perform complex image analysis, which could result in increased latency.

Figure 5A:
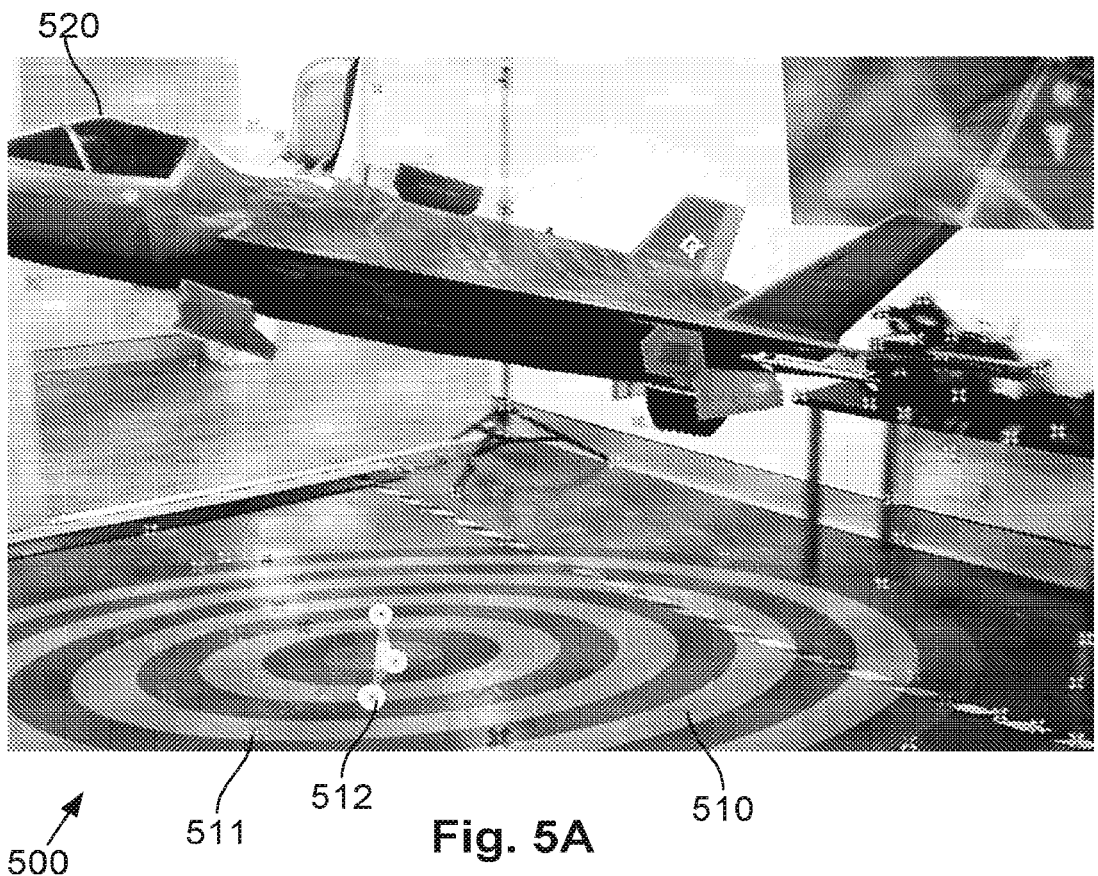
FIG. 5A is a screenshot of a first example digital reality image.
Figure 5B:
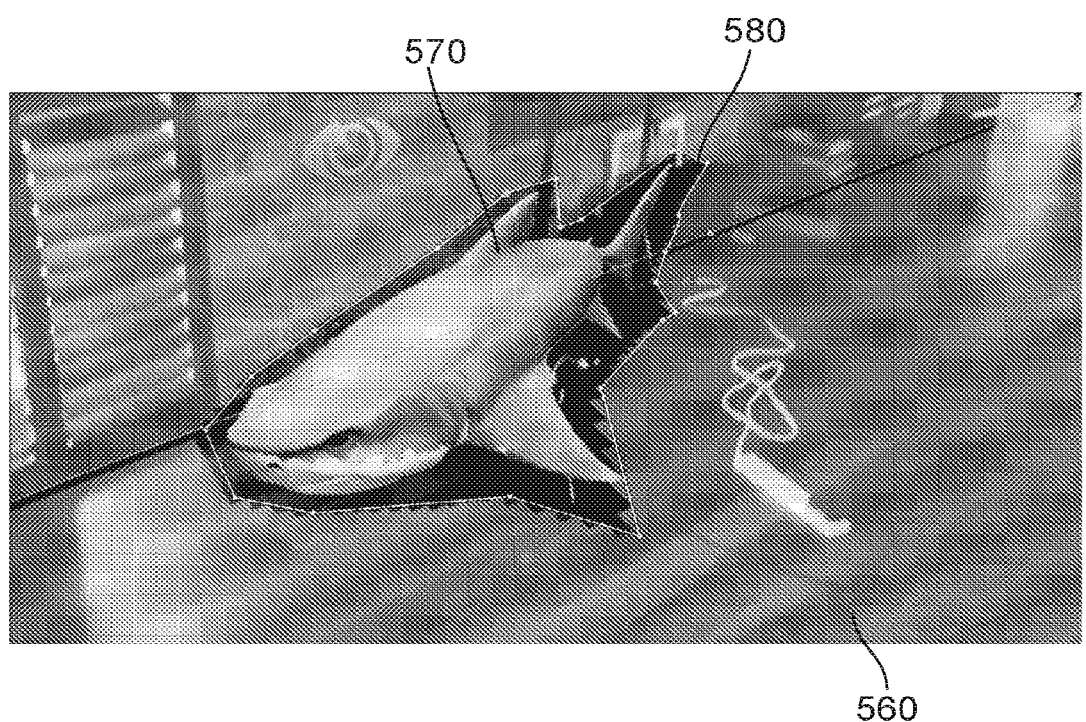
FIG. 5B is a screenshot of a second example of a digital reality image.

In this regard, the content engine contains all the information about the scene that will be rendered. Commonly at runtime, this information output is limited to necessary input and output, with very limited ability to analyze content on the fly or adjust the content, in a custom manner. The information that the content provides is limited by what the game engine's capability specification allows for and the choices defined by the content creator. However, the content engine can be configured to provide additional information as an output, for example by implementing custom code, creating or installing a third party plugin, or through customisation. In one example, this is used to generate a scene map, an example of which is shown in FIG. 5E. The scene map identifies the current field of view of the user 591 relative to a number of objects 592. In this example, when the user moves, for example as the user rotates as shown by the arrow 593, the system can estimate a change in position of features, using this to assess redundancy between images. This can also be used to predict the location of features in upcoming images, which in turn can assist with boundary construction.

It will be appreciated however, that this is not necessarily essential. As a further alternative, a low resolution image could be used to calculate the content data, allowing this to be created in advance of rendering the full resolution image, thereby enabling rendering and analysis to be performed in parallel, to avoid bottlenecks.

In one example, the encoder processing device determines a display region forming an area of interest containing the one or more objects, and then calculates the boundary extent using the display region. A display region can be utilised so that the boundary does not necessarily conform exactly to the shape of the objects. In particular, as object shapes can be quite complex, it would require a significant amount of data to describe a boundary conforming to the object shape. Consequently it is preferred that the boundary has a reduced complexity, and in particular is defined using a polygon or other easily defined shape, allowing this to be defined utilising a reduced number of bits, and an example of this is shown in FIG. 5B and will be described in more detail below. Accordingly, it will be appreciated that the boundary extent is typically calculated balancing the need to reduce the amount of image data that needs to be encoded, against the relative complexity of the boundary, whilst ensuring that the boundary wholly encompasses the one or more objects.

As mentioned above, the boundary data can be indicative of a change in boundary extent. For example, if the boundary shape remains unchanged the boundary data can instead simply indicate a translocation of the boundary as compared to a previous boundary used for a previous image. Other example changes could include rotation or changes in boundary shape. In this regard, particularly for more complex boundaries, it will be appreciated that this can reduce the amount of data utilised in order to define the boundary for a current image, for example allowing the new boundary to be defined by a single coordinate representing a new location, as opposed to having to define a coordinate for each vertex of a polygon. In this example, the method typically includes retrieving previous boundary data indicative of previous boundary for a previous image, determining a change in boundary extent from the boundary extent and the previous boundary data and generating the boundary data using the change in boundary extent.

A further alternative approach is to use an estimated boundary. In this regard, the boundary extent can be estimated based on the extent of a previous boundary and information such as display data, for example taking into account knowledge regarding a change in display device pose and/or user input commands. This works well if the area of interest is static within a scene and the only change is in the field of view of the display device relative to the scene. In this instance, as the change in field of view can be derive from the display data, this is known to both the processing device(s) and the display device, allowing the boundary data to be reduced to a simple flag indicating whether or not an estimated boundary should be used, with the boundary then being calculated independently in each device as required. The advantage of this approach is that it avoids the need to transfer complex information regarding the boundary extent, thereby substantially reducing data transmission requirements.

In one example, the estimated boundary extent can simply be estimated through translocation of the existing boundary, based on the change in display device pose. In particular, the method includes estimating a boundary extent by determining previous pose data indicative of a previous display device pose, using the pose data and previous pose data to determine a change in display device pose from display of a previous image and then determining an estimated boundary extent using the change in display device pose.

In addition to, or as an alternative to, using changes in display device pose, changes in the boundary can be calculated or estimated to take into account user inputs, for example resulting in a field of view change. For example, if a user is static and chooses to zoom in on an image, it will be appreciated that the boundary extent can simply be increased in size without any change in shape or location.

When using an estimated boundary, it is typical for every nth image in a sequence of images to be examined to ensure estimated boundaries are still accurate. To achieve this, the estimated boundary extent is compared to a calculated boundary extent, or one or more display objects in the image, to ensure the boundary is accurate. This could be performed for a current image, prior to encoding the boundary data. However, as the need to perform comparison could introduce processing delays, in another example, this could be performed based on a prior image. Thus, after an image has been compressed using an estimated boundary, the comparison is performed, with this being used to determine whether a boundary for the next image is to be estimated or calculated. Thus, for example, if the estimated boundary is no longer sufficiently close to the calculated boundary then the boundary can be recalculated for the next image, and transferred to the display device.

It will be appreciated that analogous processes are performed during decompression.

In particular, the decompression process typically determines a boundary extent and then decodes compressed image data using the boundary extent, for example by in-filling of the image in regions outside of the boundaries, or simply displaying the image inside the boundary in a position defined by the boundary. As part of this, process image data within the boundary may need to be decompressed, using a decompression technique corresponding to the compression technique use to compress the image within the boundary, with this being determined from compression data, and/or other data such as the display data or the like. This may also include substituting image data, for example obtaining the image content within the boundary with content from a previous image.

In one example, previous boundary data indicative of a previous boundary for a previous image is retrieved, with a change in boundary extent from the previous boundary being determined from the boundary data and the previous boundary, and the change in boundary extent being used to calculate the new boundary extent.

Alternatively, a boundary extent can be estimated based on a previous boundary extent and display data, such as a change in display device pose. This is typically achieved by retrieving previous boundary data indicative of a previous boundary for a previous image, determining previous pose data indicative of a previous display pose, using the pose data and previous pose data to determine a change in display device pose and then using the display device pose and the previous boundary to estimate a current boundary extent.

A similar process can be performed in order to determine an estimated boundary extent based on a field of view change, for example by retrieving previous boundary data indicative of a previous boundary for a previous image, using input commands to determine a further field of view change, such as zooming or the like, and then using the field of view change to estimate a boundary extent.

Thus the use of the boundary can effectively define a mask, with areas within the mask being compressed or substituted based on redundancy between images, and areas external to the mask being omitted, thereby avoiding the need to transmit any information for these areas.

Figure 5C:
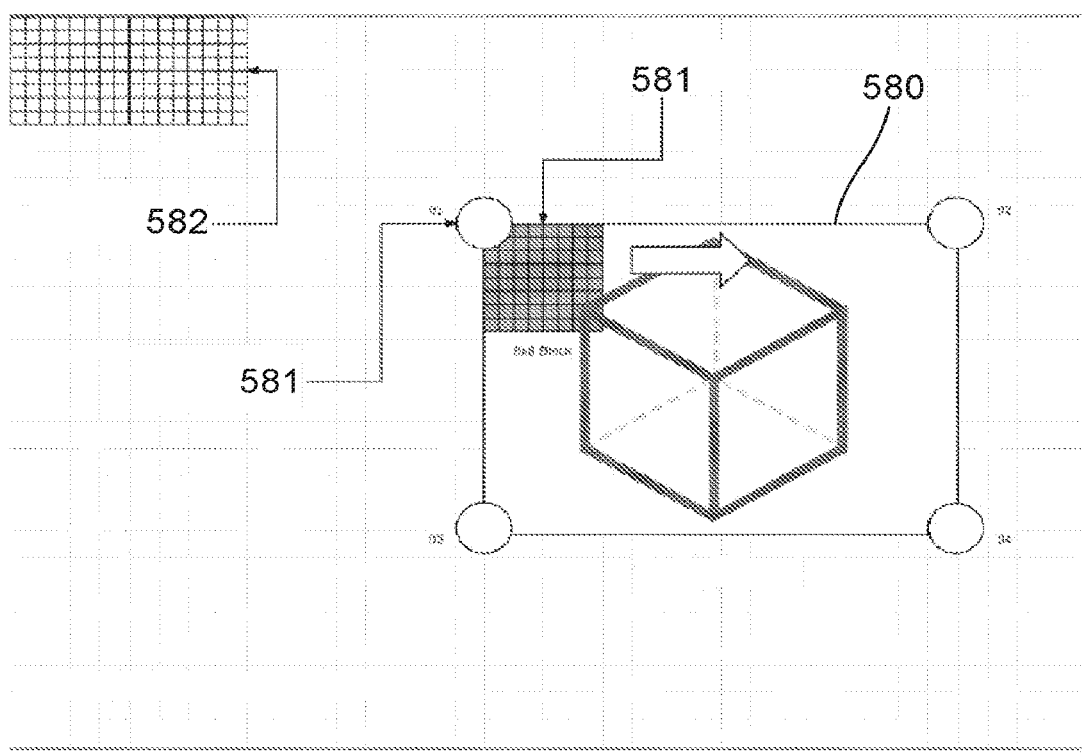
FIG. 5C is a schematic diagram illustrating an example of boundary encoding.

An example of this is shown in FIG. 5C, in which a fixed image (frame) size and aspect ratio is agreed upon between the content engine, encoder and decoder processing devices. While the aspect ratio and resolution of the frame remain static. The entire frame is rastered or updated on both the compression and de-compression side, however a pixel mask boundary 580 is defined by four vertices 581, with blocks of pixels 582 outside the mask not being transmitted and blocks of pixels 583 being compressed and transmitted for decompression. The pixel data within the mask can be compressed using any form of compression, such as DCT encoding or the like, to reduce the amount of data within the mask.

The mask could be generated by partial raster buffers, frame comparison or rendering of a low-resolution reference frame as shown above, or a difference comparison with a previous buffered frame. This could also be achieved within the content engine, for example at the GPU level, allowing the GPU to save resources for rendering and communicating this information through to the compression codec.

Temporal difference analysis could be isolated to within this masked area and the immediate pixels around its edges, allowing for a low latency temporal compression scheme.

The masked-out area, can be reconstructed during decompression in any appropriate manner, including through the use of reproduction of an Alpha Channel, reproduction of a certain color pixel group, likely to be black, or combined with another source of pixel data, perhaps from a camera.

It will be appreciated that the above description has focused on identifying areas of interest based largely on visual content of the image. However, this could also be achieved using other contextual cues, such as audible cues. For example, stereo and more advanced surround, binaural audio can provide a lot of immersion in a mixed reality application, with audio cues being tied to specific locations in a 3D scene, with this being used as a prompt for the user to focus or gaze at features of interest. This is typically performed by the content engine during creation of the 3D scene and hence this information can be used in order to locate areas of interest within the image, allowing the compression to be tailored accordingly. It will be appreciated that this is somewhat similar to performing differential compression based on eye tracking, but uses content cues to anticipate a user gaze, rather than measuring this directly.

An alternative to the use of boundaries involve block substitution. In this example, the one or more encoder processing devices obtain pixel data, which typically corresponds to an array of m×m pixels from within the image, with pixel data for sequences of pixels being determined as the image is progressively processed.

The encoder processing devices identify pixel array sequences, which are sequences of contiguous pixel arrays including substantially identical pixel content. In this regard, as discussed above for mixed or augmented reality content, large parts of the image are typically designated as black pixels so that these are not displayed. Accordingly, sequences of these can be identified and replaced.

In this regard, compression data including block data is then generated, which is indicative of a first pixel array location, an end pixel array location and the pixel array content. This allows sequences of identical pixel arrays to be replaced with a reduced amount of data, such as a code sequence, that merely specifies the pixel array content for a single pixel array, together with the start and end location, which it will be appreciated, could be based on a start location and pixel array length.

The compressed image data can then be wirelessly transferred to the display device, allowing the decoder processing devices to determine pixel array parameters from the received compression data, and use these to determine the first pixel array location, the end pixel array location and pixel array content. Following this, a pixel array sequence can be generated, utilising the pixel array content, with this being used to generate image data, thereby allowing the image to be displayed.

Accordingly, it will be appreciated that this approach acts to perform a substitution, replacing a sequence of contiguous substantially identical pixels arrays with a sequence defined by a single pixel array and a start and end location. This can substantially reduce the amount of data that needs to be transmitted, without requiring the use of lossy compression.

It will be appreciated that the particular compression scheme selected may vary depending on the nature of the content. For example in some circumstance block encoding might be more efficient than using boundaries, or vice versa. In general, the process involves using the content data to select a compression scheme and differentially compressing the image data using the compression scheme. In one example, this can involve selecting between compression schemes, such as between block encoding and boundary encoding, or defining boundaries based on contextual cues, isolation of objects, identifying areas of interest, such as facial information, or using areas of interest defined by the content engine. Whilst this could simply be performed based on analysis of the rendered image, more preferably this is achieved using some level of integration between the content engine and the encoder. In one example, this is achieved using integration at the GPU level or even the content creation level, a module/plugin installed in the game engine, that allows for the content creator to define optimization profiles for the content. This could be anything from a completely manual process to a fully automated process, using AI, neural networks or computer vision techniques that learn the properties of the image from a pre-determined database or in real time.

There could also be profile options that govern which mode the encoder operates in, it could outline such things as the type of scene and the complexity of the expected images, and is used by the encoder to select which form of compression to use. In one example, this information is transferred to the encoder as part of the content data in advance of the encoder receiving the rendered image.

A further possibility to create the content data would be to play an un-optimized version of the content, while a learning algorithm learns the unique properties of the content and applies the correct compression profile to it. An online database of this information could be implemented to ensure that this process only needs to be done by one person a single time.

Figure 5D:
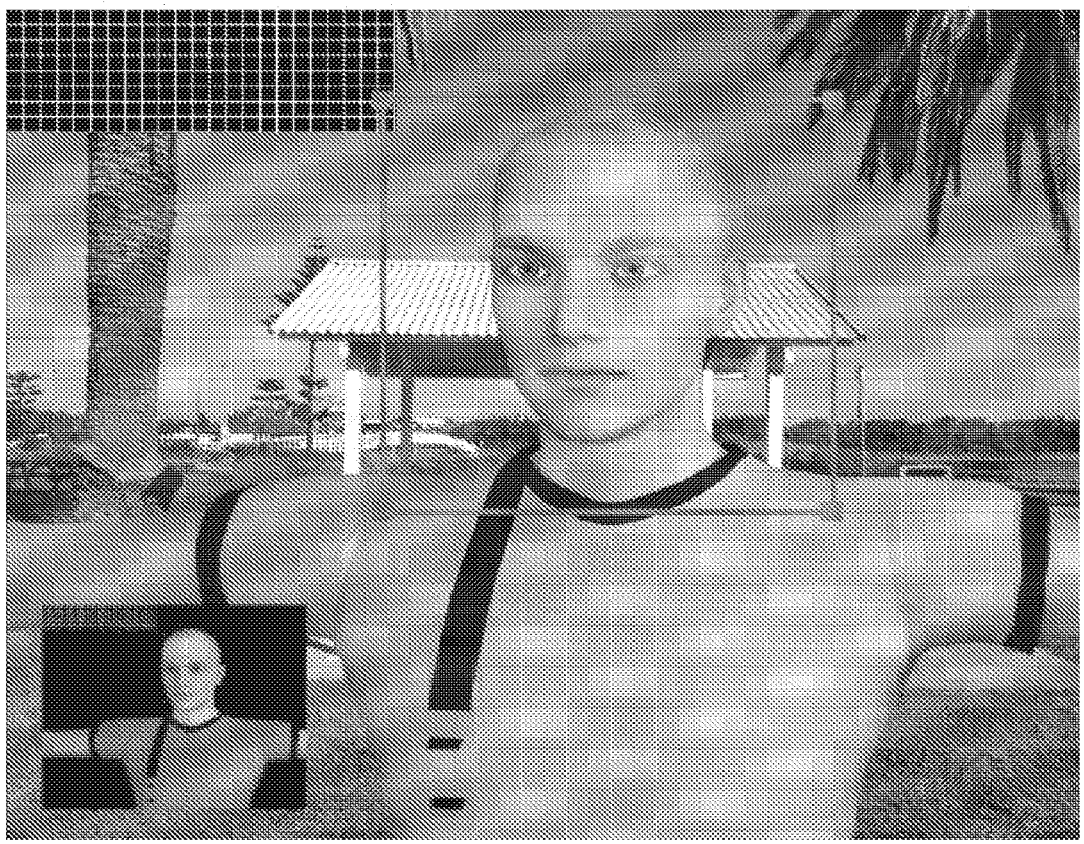
FIG. 5D is a screenshot illustrating an example of a low resolution image.
Figure 5E:
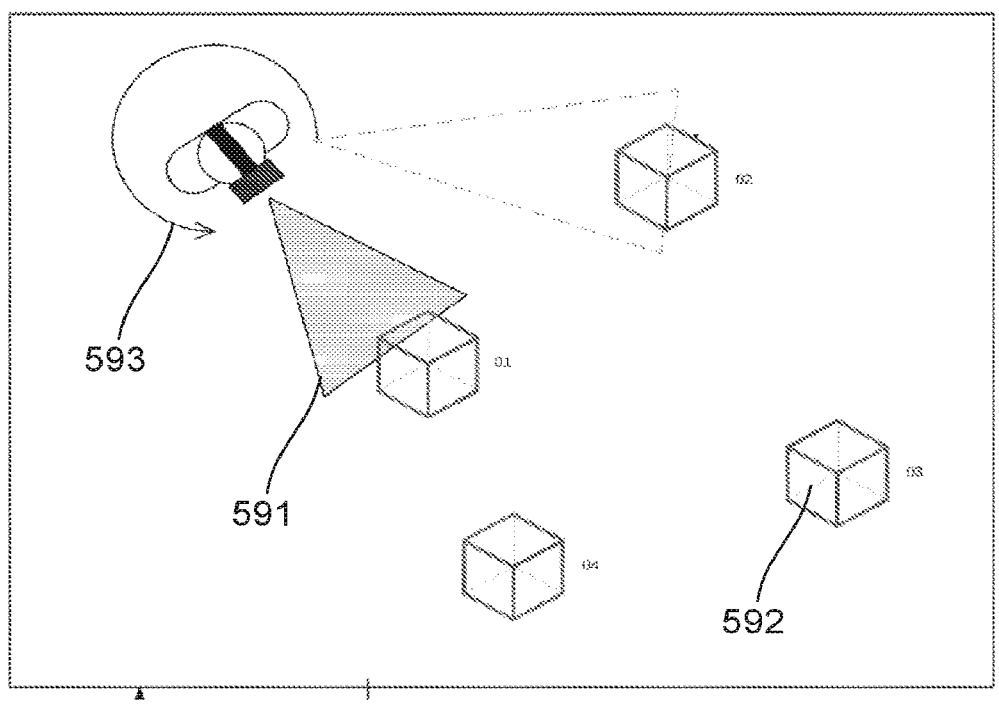
FIG. 5E is a schematic diagram of an example of a scene map.

Another possibility, as discussed above is to have the content engine render a small, low resolution frame at a defined interval in advance of providing the main high-resolution frames, as shown for example in FIG. 5D. The low-resolution frame could be quickly analyzed to identify content and hence guide the compression process. This would typically involve analysing the image to identify features such as large black or alpha channel areas that can be masked out or jump blocked, focus features like faces where higher resolution is desirable, other features that the content creator has requested the algorithm to focus on, features that have been pre-defined at the content creation point by way of a reference image, like the cross-hair pattern of a gun, or the face of an obscure looking creature. The system can also look for other useful features that can be exploited to perform dynamic adjustments, such as the presence of contextual cues, or the like.

As previously discussed, black areas in images are typically redundant, and these may alternatively be represented as an alpha channel, which is used to reproduce transparency and varying levels of opacity, and which can therefore assist with integrating the virtual object with the real world, allowing for low opacity features like shadows etc.

In one implementation, an alpha channel could be rendered by the content engine, meaning that the encoder receives RGBA channels, and can use the alpha channel in controlling the compression process. In one example, this can be achieved by applying compression across the alpha channel, with areas that are completely transparent being compressed aggressively, whilst areas with varied opacity could have less compression applied. Blocks for the alpha channel could be more aggressive in size than the RGB channels, whilst a block encoding scheme could be used to try to eliminate large transparent areas of the alpha channel. A boundary method could be used to identify the features of interest and the large transparent areas of the alpha channel could be eliminated. This process can be used to govern compression in the RGB channels, with this involving applying the compression more aggressively for areas of lower opacity, etc.

If the pre-determined size of a "block jump" is known by both the compression side and the de-compression side. For example, the raster scan is 8×8 pixel blocks, but the agreed "jump block" for any large area of pixels that are black, or alpha is groups of 32 blocks across until a block displaying RGB is classified. This could be estimated quickly using the reference image, or a partially buffered raster and allow for the predominate black or alpha areas of the image to be transmitted in groups of pixels much larger than the base 8×8 blocks. If implemented in certain configurations, this could result in a reduction in the number of bits required to be transmitted for the black pixel areas. Optimizations such as these become particularly useful with higher resolution displays of the future, featuring extremely high pixel count.

This method could also be applied to large color areas of RGB as well, although there is a limit to how many classifier profiles can be communicated to ensure a worthwhile reduction in data, so a strategy like this could be implemented within a limit of bits culled remain greater than bits sent at any time.

In another variation, the method can include compressing/decompressing image data using configuration data indicative of a display device configuration. In particular, this is performed to take into account that different display devices may have different configurations, and hence have different abilities to display image data. This can be used to optimise compression, for example, tailoring the compression to a display resolution, omitting data falling outside a field of view, compressing images based on a display refresh rate or using lens attributes to optimise compression.

In this regard, many HMD's leverage a rectangular aspect ratio display or displays, or projectors. Due to the optical properties of lenses, waveguides, total internal reflection or other methods, there are usually areas of permanent occlusion of a number of pixels. All this data is redundant and never viewed. This is information that does not need to be sent and can be permanently culled by method of a static bitmask. Further optimization and varied levels of compression can be applied in context to the unique optical properties of lenses and glass or elements that effect the refraction of light into the eye. A great amount of data can be reduced if the physiological human eye fovea is considered in unison with the image degradation properties of optics used in the HMD. Foveation can also be static, pre-determined and based purely on a combination of display, lens and eye properties that never change for a given HMD brand.

In one example, the configuration data is stored as configuration map specifying different degrees of compression that should be used for different parts of the image. The configuration data can be stored locally within and retrieved by the display device and uploaded to the encoder processing devices when a connection is first established. Alternatively, when the encoder processing devices and display device first connect, a display device identifier might be exchanged and used to retrieve configuration data.

The compression process can also take into account communications link data indicative of operation of a wireless communications link. The communications link data can be indicative of any one or more of wireless communications link error metrics, a wireless communications link quality of service, a wireless communications link bandwidth and a wireless communications link latency. Thus, this allows an overall degree of compression to be tailored to ensure the compressed image data can be suitable transmitted to the display device.

The communications link data can be received from wireless communications link hardware and/or could be determined by the display device and encoder processing devices independently, or could be exchanged between the devices. In any event, this can be known by both devices, allowing this to be used to control both the compression and decompression processes.

It will be appreciated that the above described examples approaches can be used independently, and/or in conjunction. The above described technique can also be used in conjunction with other encoding/decoding techniques, for example to allow compression of image data for objects within boundaries. Examples will now be described.

In one example, the image data forms part of a sequence of n images, with image data for at least some of the n images being compressed using a respective compression scheme. In this regard, typically a different compression scheme is used for at least some of the n images, so that at least some of the images are compressed in a different manner. The different compression schemes could provide a different degree of compression, including lossy and/or lossless compression, and might also use different compression mechanisms, for example compressing different colour space channels within different images, performing block encoding, or the like. Thus, a wide range of different image compression algorithms could be used, and reference to specific examples in the following description is not intended to be limiting. It will also be noted that at least some of the images in the sequence of n images could be uncompressed.

Accordingly, this approach provides a mechanism for compressing and subsequently decompressing a sequence of n images within a video content stream, using different compression/decompression schemes for at least some of the images, and optionally encoding some of the images with no, minimal or lossless compression.

In this regard, compression of images is typically performed in order to minimise the volume of the resulting data, for example allowing this to be stored using less storage space, or transmitted using lower bandwidths. However, compression can lead to a loss of information in the images, in turn resulting in a loss of image quality and/or introduction of compression artefacts, such as ringing, contouring, posterizing, staircase noise, aliasing, blockiness, or the like.

In typical video compression schemes compression is performed collectively across multiple frames. For example, temporal redundancy is used to take into account the fact that sequential frames are often very similar, and hence compression schemes such as MPEG-4 only encode the difference between successive frames, using motion estimation to find the difference between frames. This helps increase the degree of compression that can be performed, whilst minimising the presence of artefacts. However, for such schemes to operate optimally, it is preferable to have knowledge of the content of multiple image frames prior to commencing compression. As a result this is not generally suitable for digital reality schemes in which low latency requirements often require that each frame is compressed as rapidly as possible, meaning this is done substantially as soon as the frame is generated, and before successive frames are generated, meaning it is difficult to use temporal redundancy.

In contrast the above approach uses different compression approaches for different images within the sequence. For example, this could include compressing a sequence of five images using a lossless compression scheme for the first image, followed by four lossy compression schemes for the next four images, such as using run-length encoding, followed by colour space reduction, chroma subsampling, transform coding, fractal compression or the like.

The different compression schemes typically have different resulting qualities, and often have different compression artefacts, meaning specific artefacts are often only present in one or two images within the sequence. As each image is only viewed for a short duration of time, such as 0.04 seconds or less, the artefacts become less noticeable to the viewer. Furthermore as humans tend to perceive video content collectively across frames, viewers of the decompressed content will tend to perceive the quality collectively across the sequence of images, rather than noticing a reduction in quality on individual images. This means that as long as some of the images in the sequence have a sufficiently high quality, the user will typically not perceive a reduction in overall quality, nor will they identify specific compression artefacts if these are only limited to some of the images. Additionally, artefacts between images can be further reduced by performing blending between frames, for example to reduce flicker in pixels at a certain frequency.

Consequently, compressing a sequence of images, such as a number of video and computer graphics frames, with different compression algorithms can be used to obtain a high degree of compression, with less of a perceived reduction in quality than would otherwise by the case. This also significantly minimises the impact of compression artefacts by ensuring that similar artefacts are not present in multiple sequential images, thereby significantly reducing the extent to which such artefacts are perceived. Additionally, this approach allows each frame within the digital content stream to be compressed individually, which in turn makes this particularly suited for applications requiring a low latency, such as digital reality applications.

In one example, the compression scheme performs compression differentially based on a location of the respective pixel array within the image. Thus, in this example, the image is differentially compressed based on what part of the image in which the content is provided, and in one example, based on part of the image the user is viewing or is expected to view.

In this example, the method includes obtaining pixel data from the image data, with the pixel data representing an array of pixels within the one or more images and determining a position of the array of pixels within the one or more images relative to a defined position. In one example, the defined position is at least partially indicative of a point of gaze of the user, although this is not essential and alternatively any suitable defined position, such as a centre of the image could be used. Following this, the pixel data is compressed at least partially in accordance the determined position, so that a degree of compression depends on the determined position of the array of pixels, for example compressing image content more away from a user's gaze or more towards edges of the image, which are generally noticed less by the user.

It will be appreciated that similarly a decompression process can be performed that involves obtaining compressed image data, the compressed image data representing an array of pixels within the one or more images and being compressed at least in part based on a position of the array of pixels within the one or more images relative to a defined position, decompressing the compressed image data at least partially in accordance the determined position.

Thus, this provides a mechanism for compressing and subsequently decompressing the image, with the compression being controlled based on the location of an array of pixels relative to a defined point. Specifically this allows a degree of compression to be selected based on the position of the array of pixels, so that, less compression can be used in more important parts of an image, such as in a region proximate the point of gaze, whilst greater compression is used in other areas of the image, such as further from the point of gaze, for example in the users peripheral field of view.

In one example, this is used to provide foveated compression, allowing greater overall compression to be achieved, without a perceptible loss in quality, by increasing the compression in the user's peripheral field of view where a reduced quality of image is less noticeable.

In one example, the defined position is based on a point of gaze of the user, which can be based on an actual measured point of gaze, or an expected or predicted point of gaze of the user, determined for example by assuming the user is staring at an approximate centre of the image, or based on the content, such as a point of focus within the image, movement of the headset, or the like. Additionally, the defined point can be offset from the point of gaze, for example positioning this below the point of gaze to take account of the fact that individuals tend to perceive more detail slightly below the point of gaze to avoid colliding with obstacles when walking.

The degree of compression can be based on a distance from the defined point, for example progressively decreasing further from the point of gaze, but can also be based on a direction relative to the defined point, so that compression is greater above or below the defined point. It will be appreciated that this allows a respective degree of compression to be used in regions having any arbitrary shape positioned relative to the point of gaze, and that this could be configured depending on the particular circumstances and/or nature of the content being compressed. For example, this allows an elliptical, ovoid, or heart shaped region surrounding the defined point to have a reduced amount of compression compared to peripheral regions, to thereby maximise the image quality in regions where the user's perception of any compression artefacts will be greater.

In one example, the compression scheme compresses image data by applying a transformation to the pixel data to determine a set of frequency coefficients indicative of frequency components of the array of pixels. The transformation is typically a frequency transformation, such as a Fourier transform, or the like and in one example is a 2D DCT (Discrete Cosine Transform). The transformation could be applied in any suitable manner, for example using known transformation techniques, but in one example is performed in a highly parallel manner, thereby reducing the processing time.

Following the transformation, the process involves selectively encoding at least some of the frequency coefficients using a bit encoding scheme to thereby generate a set of encoded frequency coefficients and generates compressed image data using the encoded frequency coefficients. In this example, the bit encoding scheme can define the number of bits used to encode each of the frequency coefficients so that at least some of the encoded frequency coefficients have different numbers of bits. This process is typically performed in order to reduce the number of bits used to encode frequency coefficients, to thereby minimise the number of bits required to encode the frequency coefficients. This could include encoding some of the frequency coefficients with zero bits, thereby effectively discarding the respective frequency coefficients for use in the encoding step. Furthermore, the number of bits used is typically smaller for higher frequency components as their magnitude is smaller and as these correspond to sharp transitions within images, meaning their contribution to the overall image quality is less. This allows higher frequency component coefficients to be encoding using less bits, or even discarded without adversely effecting perceived image quality in a noticeable manner, whilst reducing the overall number of bits required to encode the frequency coefficients.

It should be noted that this approach should be contrasted to a code substitution technique, such as Huffman encoding, in which values are substituted for shorter codes. Instead, in this example the values are still encoded, albeit using a number of bits appropriate to the expected magnitude of the value, so if it expected that the value of the frequency coefficient would not exceed seven, then this could be encoded as a three bit word, so six would be encoded as "110", as opposed to using a default eight bit word "00000110". In contrast, if it is expected that the value of the frequency coefficient is up to sixty three, a six bit word could be used, so for example, twenty could be encoded "010100". In the event that the value exceeds the available number of bits, then the maximum value available for the define number of bits could be used, in turn resulting in a loss of accuracy in the resulting compressed image data.

Thus, the bit encoding scheme uses information regarding the expected size of the frequency coefficient values in order to define the number of bits that should be used. A less aggressive bit encoding scheme will use a greater number of bits, resulting in reduced compression, but with a greater resolution, whereas a more aggressive bit encoding scheme will use few bits, and hence provide greater compression, but with a trade off in reduced resolution.

It will be appreciated that in this example, the process typically involves decompressing the compressed image data by performing bit decoding of the encoded frequency coefficients in accordance with the bit encoding scheme to thereby generate a set of frequency coefficients. It will be appreciated that in one example this can result in a loss of resolution as the frequency coefficients are not necessarily accurately reproduced due to the reduction in encoding bits.

In any event, by using a bit encoding scheme that defines the number of bits used to encode each frequency coefficient, this allows the same scheme to be used in decompressing the compressed image data, in turn allowing accurate decompression to be performed, whilst allowing the bit encoding scheme used to be configured to optimise the compression for the current situation.

In another example, a transformation is applied to the pixel data to determine a set of frequency coefficients indicative of frequency components of the array of pixel, for example using a 2D DCT or other similar transformation as described above. Following this, a selected subset of the set of frequency coefficients are encoded. In this regard, the frequency coefficients that are encoded are a subset that is selected so as to maximise the effectiveness of the frequency information that is encoded, for example by selecting the frequency coefficients having the highest magnitude and which therefore contribute most to the quality of decompressed images.

The manner in which the selection is performed will vary depending on the preferred implementation, but in one example this involves selecting frequency coefficients having progressively smaller magnitudes, and hence can be defined by progressively smaller numbers of bits, until some limit is reached. However, this is not essential and other selection approaches can be used.

The frequency coefficients can be encoded in any suitable way, which can vary depending on the preferred implementation, and in one example, could include using the original bit representation of the frequency coefficient, or performing some other form of lossless encoding, as will be described in more detail below.

Following this, an index is created which is indicative of the frequency coefficients that are encoded. The index is used to identify the frequency coefficients so that these can be used to regenerate the image in a subsequent decompression step. The index can be of any appropriate form and could identify the frequency coefficients in any appropriate manner, such as by identifying a location of the coefficients, for example within a coefficient matrix. The index may be provided separately to the frequency coefficients, for example by providing the index, followed by a string of encoded frequency coefficients or could include the encoded frequency coefficients within the index, as will be described in more detail below.

Once encoding has been performed and the index created, compressed image data can be generated including the encoded frequency coefficients and index. For example, this can be performed by creating a byte stream including sequences of the encoded frequency coefficients, optionally with additional information, so as flags or other markers, to identify the start of a new image, or the like.

Accordingly, the above described process allows compressed image data to be created by encoding selected frequency coefficients, and using an index in order to identify the frequency coefficients that have been encoded. By allowing the frequency coefficients to be selected this can result in a higher image quality when the image is subsequently decompressed.

In this regard, traditional approaches focus on encoding frequency coefficients corresponding to lower frequencies, on the basis that these typically contribute most to the image quality. In this instance, by encoding the same frequency coefficients each time encoding is performed, this facilities the decoding process, but conversely means the encoding performed is not optimised to each pixel array, leading to the artefacts such as banding.

In contrast, in the current approach, frequency coefficients can be selected to optimise the resulting image, for example by encoding the largest magnitude coefficients, which in turn provide the greatest contribution to the appearance of the resulting image. The largest magnitude frequency coefficients are not limited to those of the lowest frequencies, meaning that larger high frequency coefficients could also be encoded. In this instance decompression of the image is facilitated by the inclusion of the index in compressed image data, meaning the frequency coefficients selected can vary for each pixel block, allowing the compression to be optimised for each pixel block and/or image, whilst minimising the impact on image quality.

Compressed image data can then be provided to the display device, with the encoded frequency coefficients being decoded to create a subset of frequency coefficients. It will be appreciated that the manner in which this is performed will vary depending on the nature of the encoding performed. The index is then used to generate a full set of frequency coefficients, typically by defining un-encoded frequency coefficients with a null value. An inverse transformation can be applied to the set of frequency coefficients to determine pixel data representing an array of pixels within the one or more images. In particular, this is typically in the form of an inverse frequency transformation, such as an inverse Fourier transform, 2D DCT, or the like.

Accordingly, this allows image data to be encoded by encoding a selected subset of frequency coefficients and identify the encoded frequency coefficients using an index, which can then be used when decompressing the encoded frequency coefficients. This approach is inherently adaptive, meaning the frequency coefficients selected will vary depending on the content of the pixel array being encoded, thereby ensuring the compression is optimised for the content, allowing this to maximise the amount of compression that can be achieved, whilst minimising the impact on image quality.

In one example, the method includes selecting frequency coefficients having p bits, where p is an integer initially set to a maximum number of bits and then selecting frequency coefficients having progressively decreasing values of p bits. This is performed to encode frequency coefficients having a bigger magnitude, and hence a larger number of bits, in preference to those having a smaller magnitude and hence smaller number of bits, which in turn have less impact on image quality. Typically the process of selecting progressively smaller numbers of bits is performed until encoding parameters are met, thereby selecting the subset of frequency coefficients that are encoded. For example this can be performed to ensure sufficient frequency coefficients are encoded to maintain a desired image quality, whilst minimising the overall volume of image data that is transmitted. The encoding parameters can be defined in any one of a number of ways, and can embody fixed rules, or dynamic rules allowing pixel arrays to be adaptively encoded depending on the image content, available transmission requirements, desired degrees of compression, or the like.

In another example, the method includes selecting one of a plurality of compression schemes and encoding the image data using the selected compression scheme, optionally including a code indicative of the selected scheme in the compressed image data to allow for subsequent decoding. This process can include using a particular bit encoding scheme for the above described encoding schemes, although this is not essential and the technique can be applied to any compression scheme.

In one example, the compression scheme used can be selected to optimise the compression based on current requirements. For example, this could be based on one or more operational parameters relating to operation of the hardware and/or image parameters relating to the image. The operational parameters can includes any one or more of a transmission bandwidth of a communications link used to transmit the compressed image data, a transmission quality of service of a communications link used to transmit the compressed image data, movement of a display device, image display requirements, a target display resolution, or the like. Similarly the image parameters can include any one or more of a channel being processed, a position of the array of pixels within the one or more images, a position of the array of pixels within the one or more images relative to a point of gaze of an observer of the one or more images, or the like. As a further alternative, error metrics indicative of errors in the decompressed images and/or transmission of data can be used in order to control the degree of compression used.

It will be appreciated that these arrangements can be used to adjust the degree of compression dynamically, for example by changing the thresholds or bit encoding schemes based on current error values, the content of the pixel array, transmission bandwidth, or the like. For example, if compression artefacts exceed a set amount, the degree of compression can be reduced by adjusting the thresholds, whilst if available transmission bandwidth falls, compression can be increased. This ability to dynamically adjust the compression helps optimise the compression to obtain the best possible image quality for the current circumstances.

For example, in the case of movement of the display device, feedback from a head tracking system can be provided to the encoding algorithm, allowing the encoding algorithm to select the compression scheme on the basis of head acceleration information, allowing the compression algorithm to make dynamic adjustment to both frame-rate and amount of compression. Such movement feedback data could read out from an internal IMU (Inertial Measurement Unit) within the HMD or a secondary one, for example forming part of a decoder or separate system.

It will be appreciated that a wide range of other techniques could be used, including scaling frequency coefficients to reduce their magnitude, selectively encoding different colour channels in parallel, performing colour channel conversion, or the like. It will be appreciated that such technique can be used in conjunction with the approaches described above, thereby compressing image data not compressed using other techniques, for example to compress image data within the boundaries.

Figure 2A:
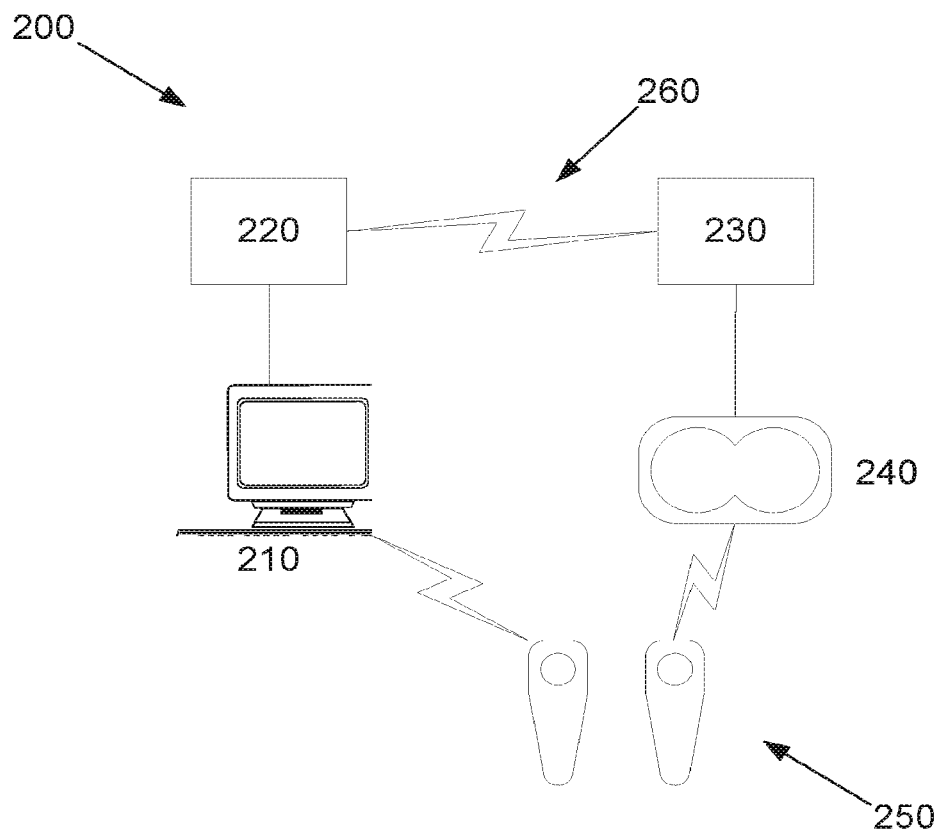
FIG. 2A is a schematic diagram of a first example of an apparatus for displaying images on a wearable device.

The above described operation can be implemented using a range of different hardware configurations. In one example, the apparatus includes an encoder and decoder in wireless communication, allowing image data to be transferred between the encoder and decoder as compressed image data. In one particular example, this can be utilised in order to provide wireless communication between a wearable display device, such as an HMD and a processing system. An example of this will now be described with reference to FIG. 2A.

In this example, a processing system 210, such as a suitably programmed computer system, gaming console, or the like, is adapted to generate content for display on an HMD 240. The processing system 210 typically achieves this by receiving sensor data from the HMD regarding the pose of the HMD, and optionally input data from one or more separate controller 250. The processing system 210 then generates content based on the sensor and/or input data, typically in the form of video data, which can be output from a video card or the like. The video data is transferred to an encoder 220, which encodes the video data by compressing the image data, before wirelessly transferring the compressed image data to the decoder 230, via a wireless communications link 260. The decoder 230 decodes the compressed image data, and provides the resulting video data to the HMD for display.

It will be appreciated that this arrangement allows for existing computer systems, gaming consoles or the like and HMDs 210, 240, to be connected via a wireless connection 260, thereby obviating the need for a wired connection between the processing system 210 and HMD 240. Thus, for example, a user could wear an HMD and associated decoder, and then connect the encoder to their computer system or gaming console, allowing a wireless HMD arrangement to be provided.

Figure 2B:
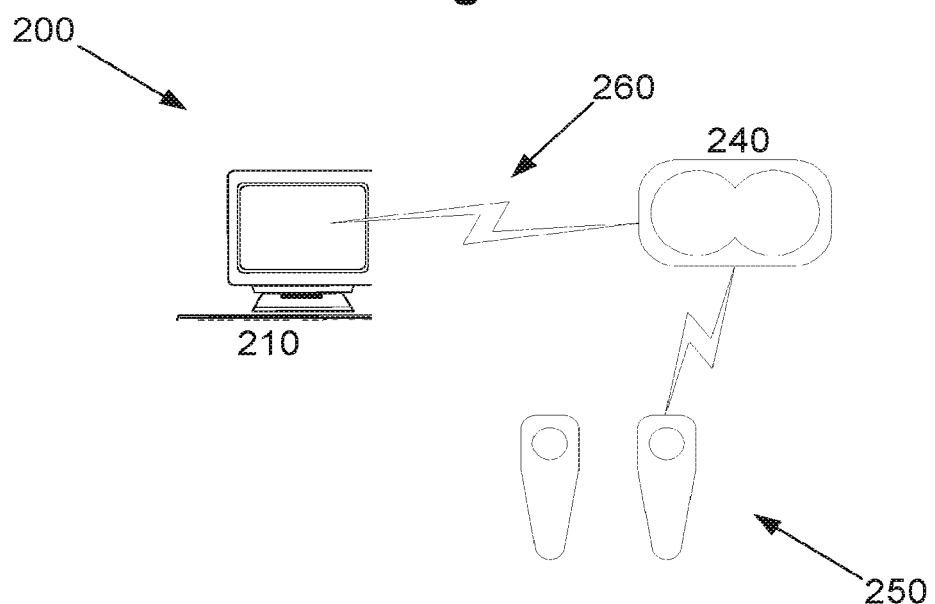
FIG. 2B is a schematic diagram of a second example of an apparatus for displaying images on a wearable device.

However, this is not essential, and alternatively, the processing system 210 and HMD 240 can be configured to include integrated encoder and decoder hardware, allowing these to communicate via a direct wireless connection 260, as shown in FIG. 2B.

Figure 3:
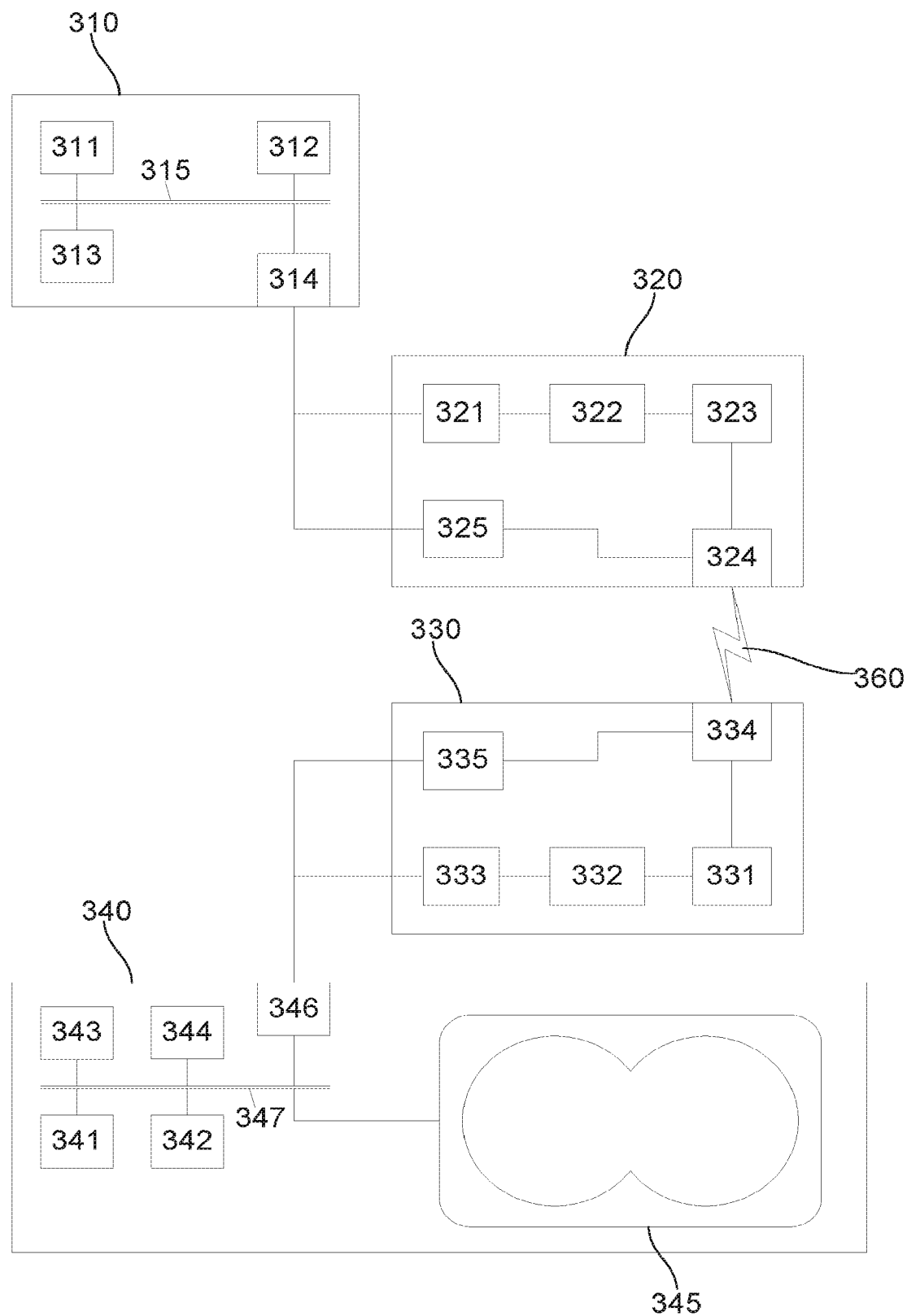
FIG. 3 is a schematic diagram of a specific example of a digital reality system incorporating apparatus for compressing and decompressing image data.
Figure 4A:
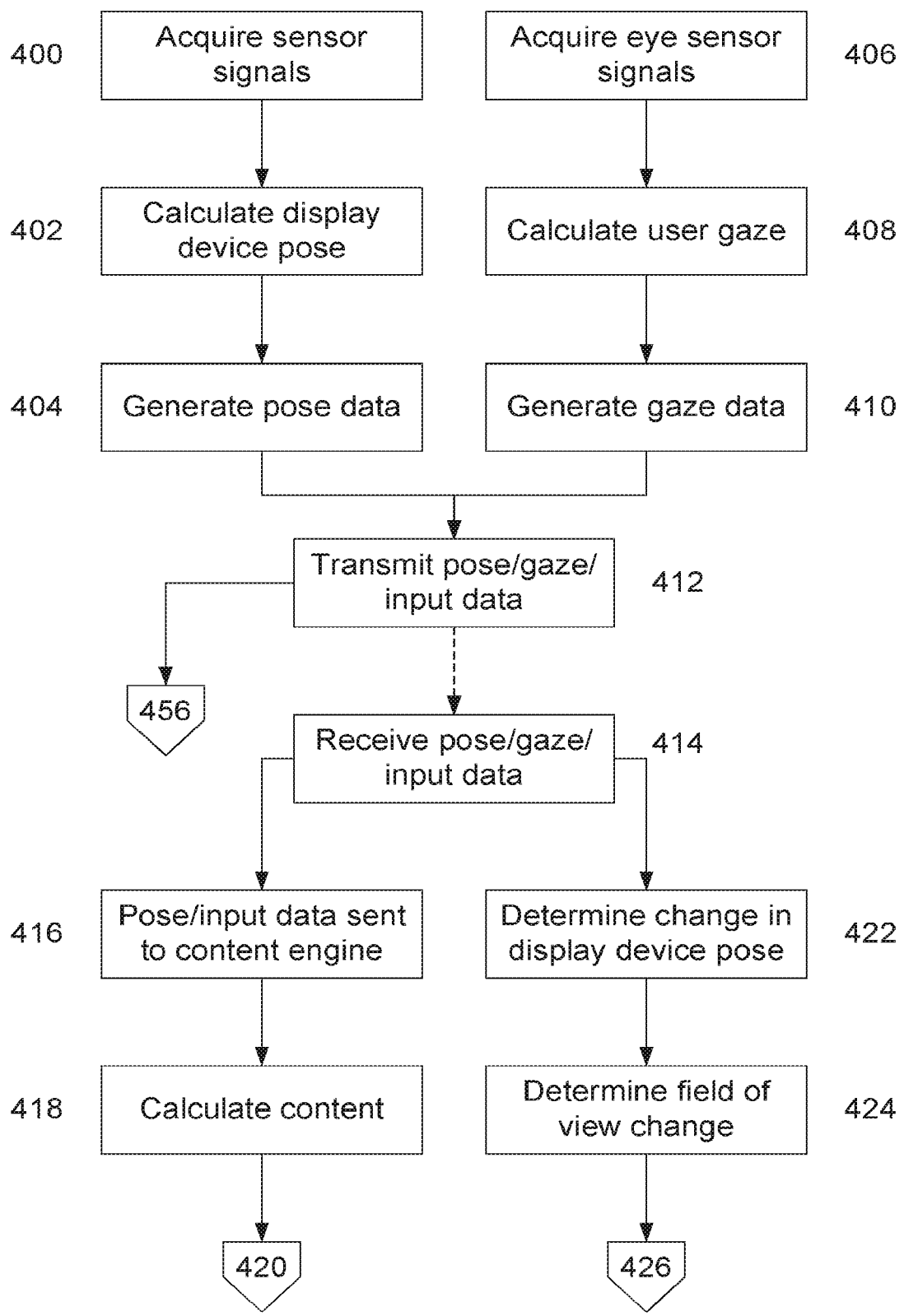
FIGS. 4A to 4D are a flowchart of a specific example of a method for compressing and decompressing image data for use in a digital reality application.
Figure 4B:
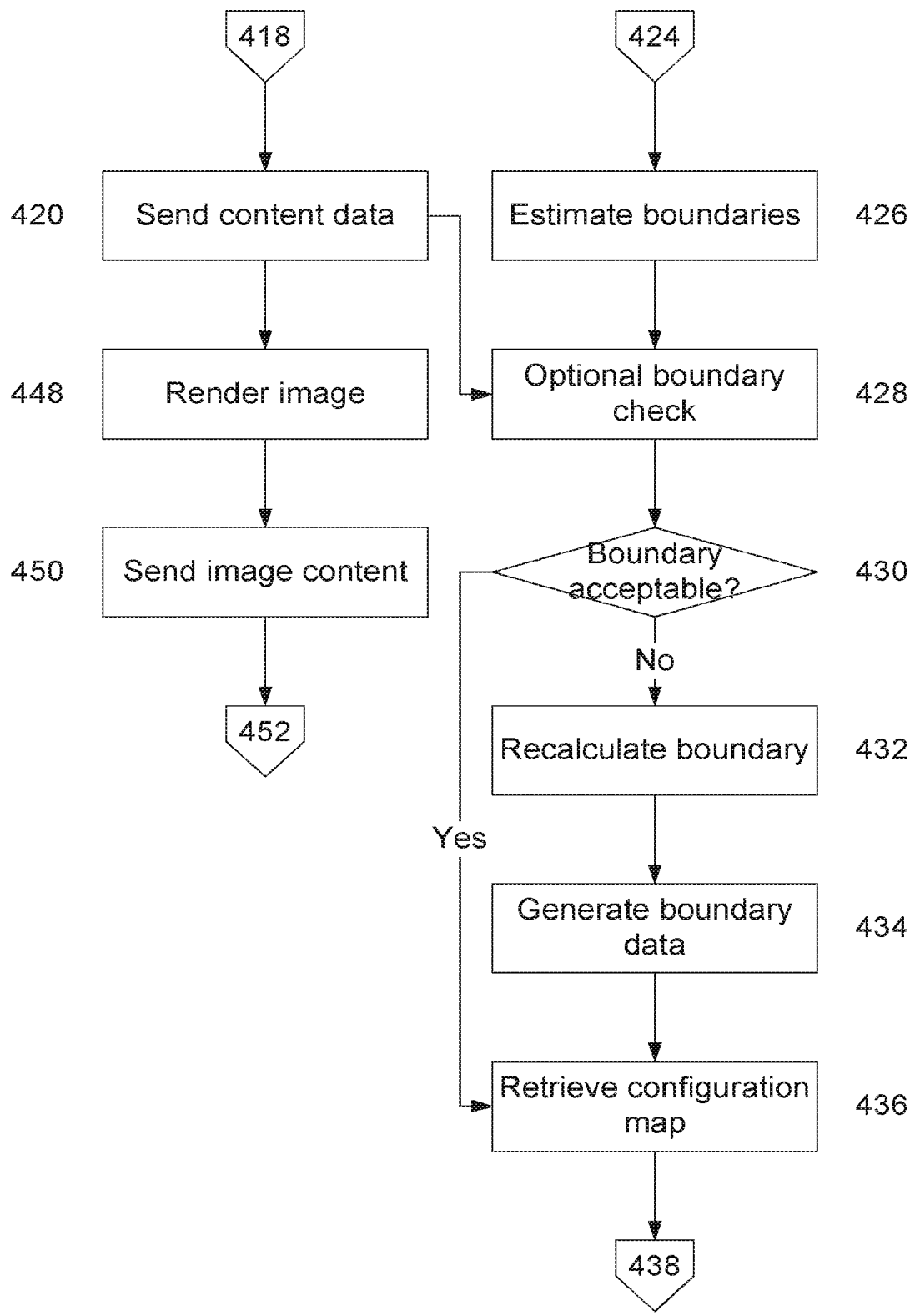
Figure 4C:
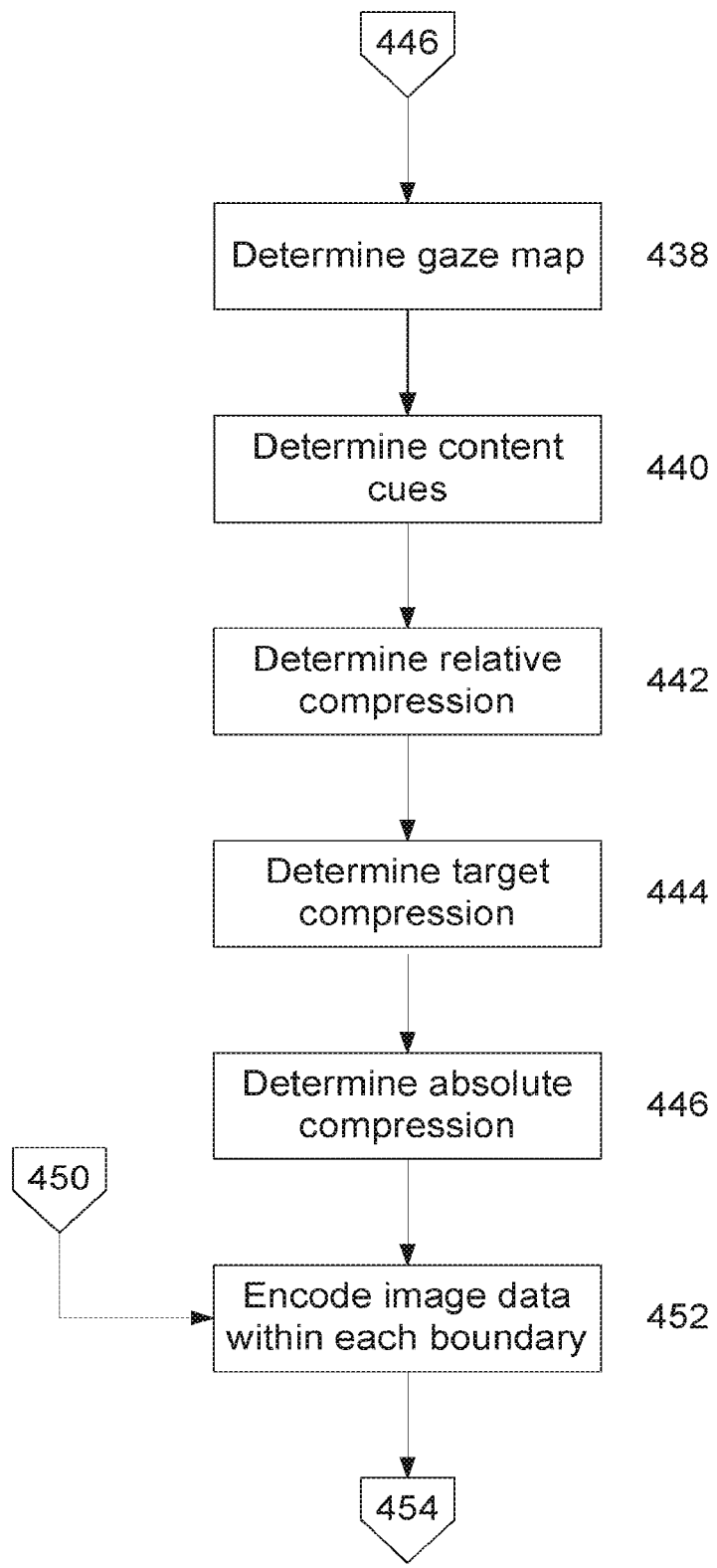
Figure 4D:
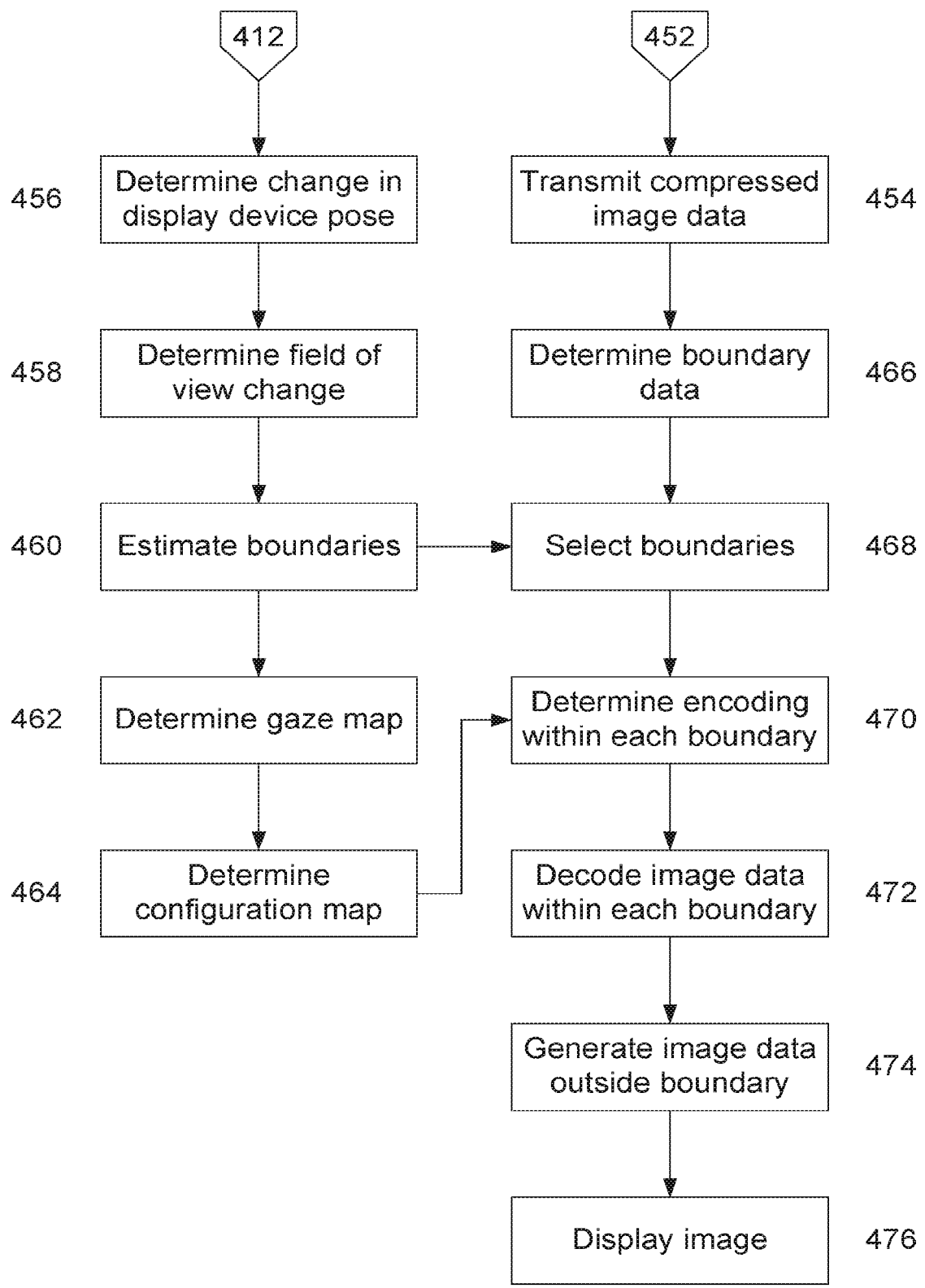

An example of the hardware configuration will now be described in more detail with reference to FIG. 3.

This example will be illustrated with respect to a separate hardware encoder and decoder, but it will be appreciated that this is not essential and the same techniques could be used in conjunction with integrated hardware. Furthermore, whilst reference to made to virtual reality applications, again this is not essential and the techniques could be used to apply to any circumstance in which image data forming part of a content stream is to be transferred, and in particular when a content stream is to be transferred using a limited bandwidth, whilst maintaining an acceptable image quality and desired latency, such as in virtual reality, augmented reality, mixed reality, or telepresence applications.

In this example, the apparatus 300 again includes a processing system 310, encoder 320, decoder 330 and a display device 340, in the form of an HMD or similar. Each of these components will now be described in more detail.

In this example, the processing system 310 includes at least one microprocessor 311, a memory 312, an optional input/output device 313, such as a keyboard and/or display, and an external interface 314, interconnected via a bus 315 as shown. In this example the external interface 314 can be utilised for connecting the processing system 310 to peripheral devices, such as communications networks, storage devices, peripherals, or the like. Although a single external interface 314 is shown, this is for the purpose of example only, and in practice multiple interfaces using various methods (eg. Ethernet, serial, USB, wireless or the like) may be provided. In this particular example, the external interface includes at least a data connection, such as USB, and video connection, such as DisplayPort, HMDI, Thunderbolt, or the like.

In use, the microprocessor 311 executes instructions in the form of applications software stored in the memory 312 to allow the required processes to be performed. The applications software may include one or more software modules, and may be executed in a suitable execution environment, such as an operating system environment, or the like.

Accordingly, it will be appreciated that the processing system 310 may be formed from any suitable processing system, such as a suitably programmed PC, or the like. In one particular example, the processing system 310 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), an Application-Specific Integrated Circuit (ASIC), a Graphics Processing Unit (GPU) or any other electronic device, system or arrangement.

Furthermore, whilst the processing system 310 is shown as a single entity, it will be appreciated that in practice the processing system 310 could be formed from multiple physical devices, which can optionally be distributed over a number of geographically separate locations, for example as part of a cloud based environment.

The encoder 320 typically includes an encoder input buffer 321, coupled in turn to an encoder processing device 322, an encoder output buffer 323, and a transceiver 324. A separate data buffer 325 can be provided coupled to the transceiver 324.

In use, image data, and in one particular example, video data is received and temporarily stored in the input buffer 321, before being passed to the encoder processing device 322 for compression. In this regard, the encoder input buffer typically buffers image data corresponding to a next m−1 rows of pixels of the image, and then a next m pixels of the next row of pixels. This allows the encoder processing device 322 to obtain pixel data for a next m×m block of pixels from the buffered image data, and commence encoding. It will be appreciated however that this is not essential and other buffering schemes could be used, including buffering previous frames, for use in encoding differences between subsequent frames.

Once this has been done a next m pixels are buffered, with this being repeated until pixel data from the first m rows of pixels has been obtained and is being encoded. This process is then repeated for subsequent rows of pixels in the image, until pixel data is acquired for the entire image, at which point a next image is processed in a similar manner. As a result of this approach, the encoder input buffer need never store more than m−1 complete rows and m pixels of image data from the next row, reducing memory requirements. Additionally, as pixel data is acquired, this can be immediately processed using the encoding process, even before the next m pixels of image data are buffered. This significantly reduces processing time and helps minimise overall latency.

The resulting compressed image data is then stored in the encoder output buffer 323, for example by sequentially reading in encoded bits, to thereby perform parallel to serial byte encoding, before being transferred to the decoder 330, via the transceiver 324. The transceiver 324 is also adapted to transfer other data, such as a sensor data received from the HMD 340, via the encoder data buffer 325.

The buffers 321, 323, 325 can be of any appropriate form of temporary storage, depending on the preferred implementation, and in one example can include high-performance FIFO (First-In-First-Out) field memory chips, or the like. The input buffer is typically connected to an HDMI port, display port output, or any other suitable video source, whilst the data buffer 335 is connected to a USB port, thereby allowing equivalent connection to the computer system.

The transceiver 324 can be of any appropriate form, but in one example allows for short range radio based communication 360 between the encoder and decoder, for example via a point to point direct WiFi™ connection, 60 GHz wireless technology, mobile phone networks, such as 3G, 4G or 5G networks, or the like.

The processing device 322 can be any device capable of performing the compression process, including the compression processes described herein. The processing device 322 could include a generic processing device operating in accordance with software instructions stored in memory. However, in one example, in order to ensure a suitably quick compression time, the processing device includes custom hardware configured to perform the compression process. This could include, firmware optionally associated with implementing logic such as an FPGA (Field Programmable Gate Array), a Graphics Processing Unit (GPU), an Application-Specific Integrated Circuit (ASIC), Digital Signal Processing (DSP), or any other electronic device, system or arrangement.

In a preferred example, the encoder processing device 322 is configured to perform parallel processing of individual colour channels, such as RGB or YCbCr channels. For example, this could include parallel encoding of the individual frequency coefficients for each channel. Furthermore, whilst a single encoder processing device 322 is shown, in practice, a respective encoder processing device 322, could be provided for encoding each colour channel in parallel, or alternatively a GPU or other similar parallel processing architecture could be used.

The decoder 330 typically includes a transceiver 334 coupled to a decoder input buffer 331, in turn coupled to a decoder processing device 332 and a decoder output buffer 333. A separate data buffer 335 can also be provided coupled to the transceiver 334.

In use, compressed image data is received from the encoder 320 via the transceiver 334, and temporarily stored in the input buffer 331, before being passed to the decoder processing device 332 for decompression. The resulting image data is then stored in the decoder output buffer 333, before being transferred to the display device 340. The transceiver 324 is also adapted to transfer other data, such as a sensor data received from the display device 340, via the decoder data buffer 335.

The buffers 331, 333, 335 can be of any appropriate form of temporary storage, depending on the preferred implementation, and in one example can include high-performance FIFO (First-In-First-Out) field memory chips, or the like. The output buffer is typically connected to an HDMI port, whilst the data buffer 335 is connected to a USB port, thereby allowing equivalent connection to the display device.

The transceiver 334 can be of any appropriate form, but in one example allows for short range radio based communication 360 between the encoder and decoder, for example via a point to point direct WiFi™ connection, 60 GHz wireless technology, mobile phone networks, such as 3G, 4G or 5G networks, or the like.

The processing device 332 could include a generic processing device operating in accordance with software instructions stored in memory. However, in one example, in order to ensure a suitably low decompression time, the processing device includes custom hardware configured to perform the decompression process. This could include, firmware optionally associated with implementing logic such as an FPGA (Field Programmable Gate Array), a Graphics Processing Unit (GPU), an Application-Specific Integrated Circuit (ASIC) or any other electronic device, system or arrangement.

In a preferred example, the decoder processing device 332 is configured to perform parallel decompression of individual channels, for example by performing parallel encoding of the individual frequency coefficients. Again, whilst a single decoder processing device 332 is shown, in practice, a respective encoder processing device 332 could be provided for encoding each of the channels in parallel, or alternatively a GPU or other similar parallel processing architecture could be used.

The display device 340 includes at least one microprocessor 341, a memory 342, an optional input/output device 343, such as a keypad or input buttons, one or more sensors 344, a display 345, and an external interface 346, interconnected via a bus 347 as shown.

The display device 340 can be in the form of HMD, and is therefore provided in an appropriate housing, allowing this to be worn by the user, and including associated lenses, allowing the display to be viewed, as will be appreciated by persons skilled in the art.

In this example, the external interface 347 is adapted for normally connecting the display device to the processing system 310 via a wired connection. Although a single external interface 347 is shown, this is for the purpose of example only, and in practice multiple interfaces using various methods (eg. Ethernet, serial, USB, wireless or the like) may be provided. In this particular example, the external interface would typically include at least a data connection, such as USB, and video connection, such as DisplayPort, HMDI, Thunderbolt, or the like.

In use, the microprocessor 341 executes instructions in the form of applications software stored in the memory 342 to allow the required processes to be performed. The applications software may include one or more software modules, and may be executed in a suitable execution environment, such as an operating system environment, or the like. Accordingly, it will be appreciated that the processing device could be any electronic processing device such as a microprocessor, microchip processor, logic gate configuration, firmware optionally associated with implementing logic such as an FPGA (Field Programmable Gate Array), a Graphics Processing Unit (GPU), an Application-Specific Integrated Circuit (ASIC) or any other electronic device, system or arrangement.

The sensors 344 are generally used for sensing an orientation and/or position of the display device 340, and could include inertial sensors, accelerometers or the like, but in one example include image sensors adapted to image the local environment, allowing the display device pose to be calculated using a SLAM algorithm. Additional sensors, such as light or proximity sensors could be provided to determine whether the display device is currently being worn, whilst eye tracking sensors could be used to provide an indication of a point of gaze of a user.

Input devices can also be provided, allowing user input commands to be transferred to the processing device 310, via the decoder and encoder, for example to allow the user to interact with the content. Such input devices could be based on controllers, but alternatively could be determined through the use of hand gestures sensed by image sensors 344 and/or eye gestures sensed by the eye tracking sensors.

In one example, the display device could therefore be an existing commercial display device, such as an HTC Vive™, Oculus Rift' or Playstation VR™ headset, although it will be appreciated that this is not essential and any suitable arrangement could be used.

An example of the operation of the image compression/decompression process will now be described in more detail.

For the purpose of this example, it is assumed that the processing systems 310 is executing applications software that generates content that is displayed on the display device 340, with the content being displayed dynamically based on sensor data from sensors 344 on board the display device 340, and optionally other sensors, such as handheld controllers or position detection systems (not shown), as will be appreciated by persons skilled in the art.

Actions performed by the processing system 310 being performed by the processor 311 in accordance with instructions stored as applications software in the memory 312 and/or input commands received from a user via the I/O device 313, or other peripherals (not shown). Actions performed by the display device 340 are performed by the processor 341 in accordance with instructions stored as applications software in the memory 342.

The encoder 320 and decoder 330 act as interfaces between the processing system 310 and display device 340, allowing image data to be compressed, transmitted wirelessly, and then decompressed before being displayed on the display device 340, whilst also allowing sensor data or other input command data to be transferred back to the processing system. Actions performed by the encoder 320 and decoder 330 are typically performed by the respective processing device 322, 332, based on defined programming, and in one example a custom hardware configuration and/or instructions in embedded firmware.

However, it will be appreciated that the above described configuration assumed for the purpose of the following examples is not essential, and numerous other configurations may be used. For example, the functionality of the encoder and decoder could be inbuilt within the processing system 310 and display device 340 directly, for example incorporating the functionality into processing devices within the processing system 310 or display device 340. Additionally, the compression techniques can be applied in a wide range of other scenarios, including compressing and decompressing image streams on one or more computer systems, without requiring the use of the separate display device. Nevertheless, the above arrangement is particularly beneficial for virtual, augmented or mixed reality applications, telepresence applications, or the like.

An example of an overall process for compressing and subsequently decompressing image data for use in a digital reality application will now be described in more detail with reference to the flowchart of FIGS. 4A to 4D.

In this example, at step 400 the display device 340 acquires sensor signals from one or more sensors 344, utilising these to calculate a display device pose at step 402. In a preferred example, this involves the use of inside out tracking, in which on-board sensors 344 in the display device sense the surrounding environment, allowing the display device 340 to calculate the display device pose. The pose is generated as pose data at step 404, which in one example includes an indication of the relative position of a number of points in the environment, as detected utilising a SLAM algorithm.

An example of a captured image is shown in FIG. 5A, in which a mixed reality image 500 is shown including an environment 510 and digital reality objects 520 shown in relation to the environment. In this example, a number of features in the environment are identified utilising detection techniques, as shown by the crosses 511, with some of these acting as tracking features 512, allowing the pose of the display device to be calculated and saved as pose data at step 404.

Simultaneously with this process, the display device 340 acquires signals from eye sensors at step 406, with these being used to calculate a user gaze and in particular a gaze direction of each eye at step 408, with this information being saved as gaze data at step 410. It will also be appreciated that other display data could be captured in an analogous manner, and this will not therefore be described in detail.

At step 412 the display device 340 transmits the pose and gaze data, together with any input commands provided via a user interface, such as a hand-held controller, and/or any other display data to the processing system 310 for analysis.

In this regard, the processing system 310 receives the pose/gaze/input data at step 414 and provides the pose and input data to a content engine at step 416. The content engine uses this to calculate content to be displayed, for example calculating object details at step 418, and in particular an extent and location of the objects to be displayed for use in the digital reality content. At step 420 content data is sent back to the processing device 310, with the content data either including details of the content, such as the object details, information regarding other content, such as audible cues, or the like, a scene map and/or a low resolution image that can be analysed by the processing device. This is typically performed as part of the process of generating the image, but in advance of the image being rendered, to thereby optimise the process and reduce latency.

Simultaneously with this process, the processing device 310 determines a change in display device pose based on the pose data and previous pose data associated with a previous pose. Similarly, the processing device 310 determines a field of view change based on input data at step 424.

At step 426 the processing device 310 estimates new image boundaries. An example of a boundary is shown in FIG. 5B, in which an object 570 is located in an environment 560. A boundary 580 is shown surrounding the object, which can be defined utilising a number of vertices. The boundary is estimated based on a previous boundary determined from previous boundary data associated with a previous image based on the change in display device pose and the change in field of view.

At step 428 the content details and estimated boundaries can optionally be used to perform a boundary check. This can be performed by comparing the boundary to extents of the objects and/or areas of interest, to ensure that these are located within the boundaries. Whilst this can be performed for every image, more typically this is performed for every $n^{th}$ image, with the value of n being defined, and potentially variable, for example depending on a rate of movement of the display device 340. This is performed to avoid introducing excessive latencies into the boundary determination process. Furthermore, in one example, such boundary checks are performed after compression and transmission of the image data, with this being used to determine whether a new boundary should be calculated for subsequent images so that this does not delay the compression and transmission of the image data.

If it is determined that the boundary is not acceptable at step 430, the processing system 310 recalculates the boundary at step 432. In this regard, the boundary can be recalculated by having the processing system 310 draw one or more new boundaries surrounding the objects, based on the object details received from the content engine. Boundary data is then created corresponding to the new boundary at step 434, with this optionally being defined in terms of a new absolute boundary, or based on a change in boundary extent compared to a previous boundary.

Figure 6A:
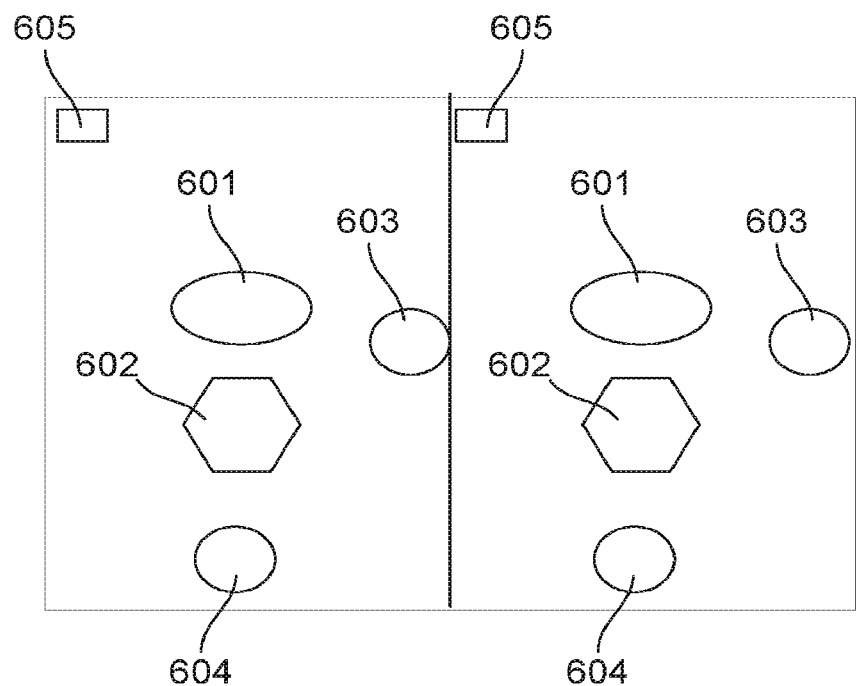
FIG. 6A is a schematic diagram of an example of a number of areas of interest defined by respective boundaries.

Examples of multiple boundaries for left and right eye images for a single scene are shown in FIG. 6A, which includes five different shaped boundary regions 601, 602, 603, 604, 605.

Once an estimated or calculated boundary is deemed acceptable at step 436, the processing system 310 retrieves a configuration data in the form of a configuration map based on the configuration of the current display device. This is typically achieved based on an initial exchange of information between the display device and the processing system 310, occurring for example when the display device and processing system are initial set-up or paired for use.

Figure 6B:
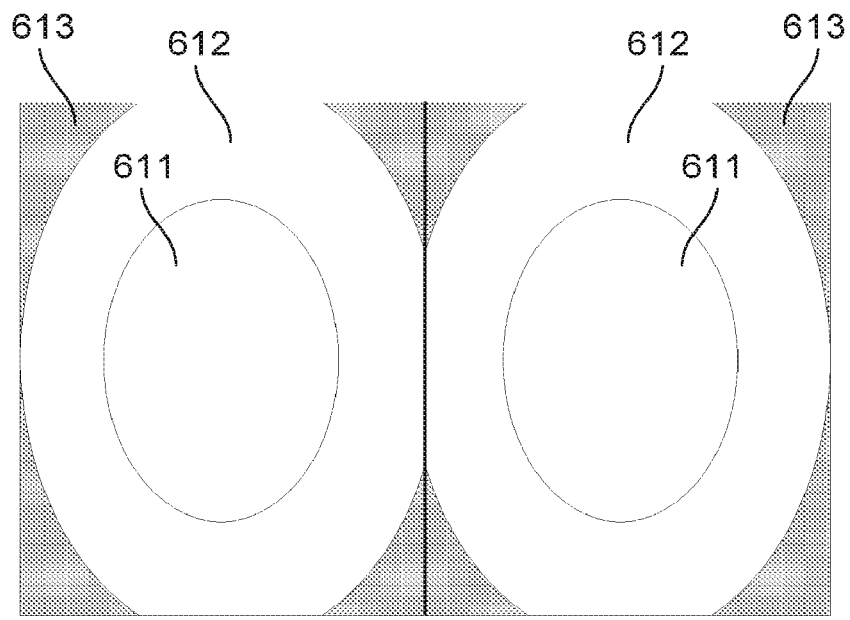
FIG. 6B is a schematic diagram of an example of a configuration map.

An example, of configuration map is shown in FIG. 6B, which includes a respective map for left and right eye images. In this example, the map includes a first, second and third display regions 611, 612, 613 for which progressively less image detail can be displayed, typically due to the lens configuration. In this example, the third display region 613 falls outside of the field of view of the particular display device and hence cannot be displayed, meaning image content in this region can be discarded, whilst the second display region 612 corresponds to a region for which a higher degree of compression can be used compared to the first display region 611. Whilst three regions are shown, this is not intended to be limiting, and any suitable number could be used, or alternatively a continuously changing degree of compression could be defined, depending largely on the display device capabilities.

Figure 6C:
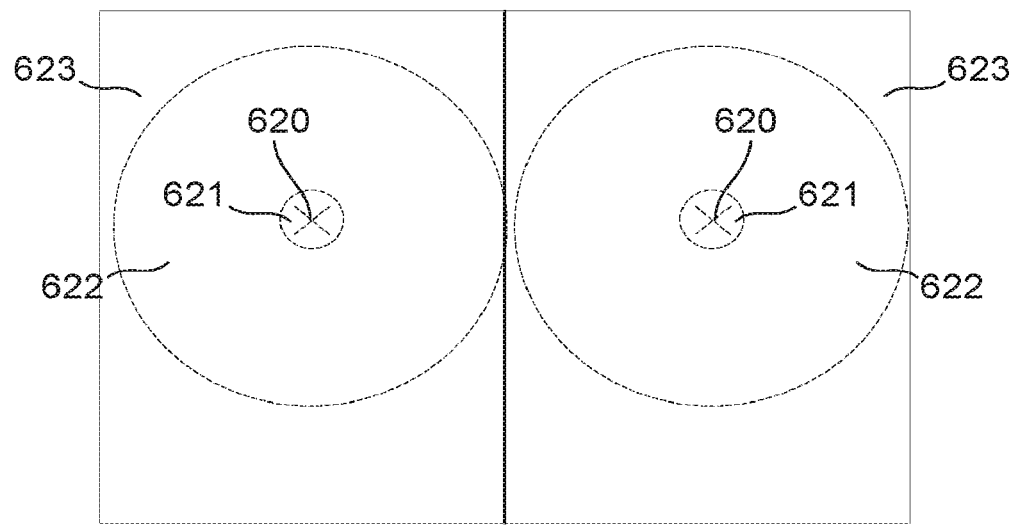
FIG. 6C is a schematic diagram of an example of a gaze map.

At step 430, the processing system determines a gaze direction and depth from the gaze data with this being used to determine a gaze map, an example of which is shown in FIG. 6C. In this example, points of gaze 620 for each eye are surrounded by respective first, second and third gaze regions 621, 622, 623 for which progressively less detail is perceived by the user, allowing higher degrees of compression can be used. Again, whilst three regions are shown, this is not intended to be limiting, and any suitable number could be used, or alternatively a continuously changing degree of compression could be defined, depending largely on the display device capabilities.

At step 440, the content data is analysed, to determine content cues, such as the relative importance of different boundary regions, to determine the relative amount of compression that can be applied based on the content.

Figure 6D:
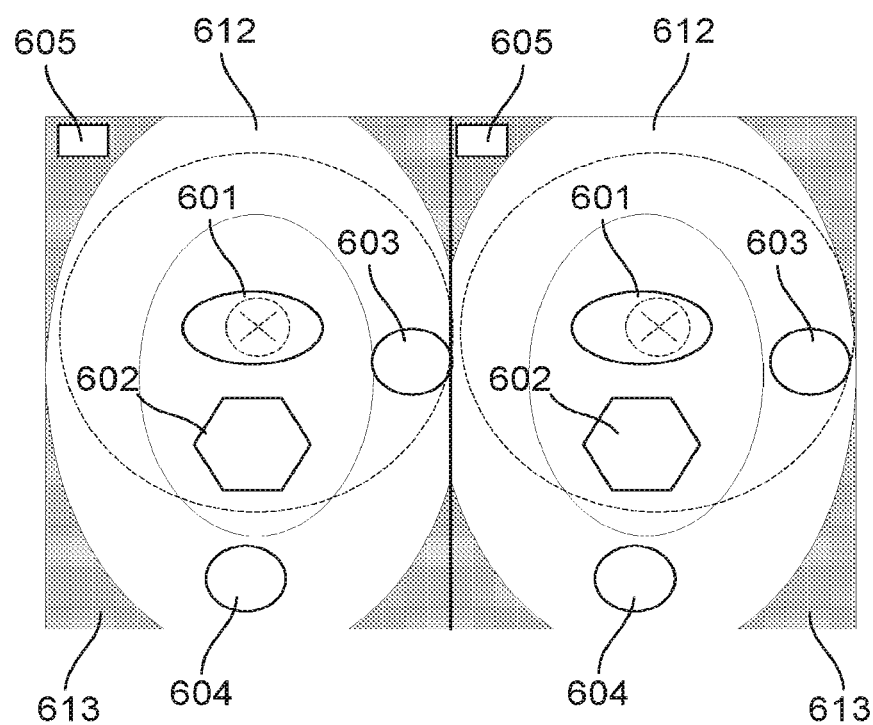
FIG. 6D is a schematic diagram of areas of interest of FIG. 6A overlaid on the configuration and gaze maps of FIGS. 6C and 6D; and, FIG. 6E is a schematic diagram showing relative degrees of compression for the areas of interest of FIG. 6A.

The information from each of these is then combined to determine a relative degree of compression, and an example of this is shown in FIG. 6D. For the purpose of explanation, this example ignores the effect of content cues, but the general approach will nevertheless be understood.

Figure 6E:
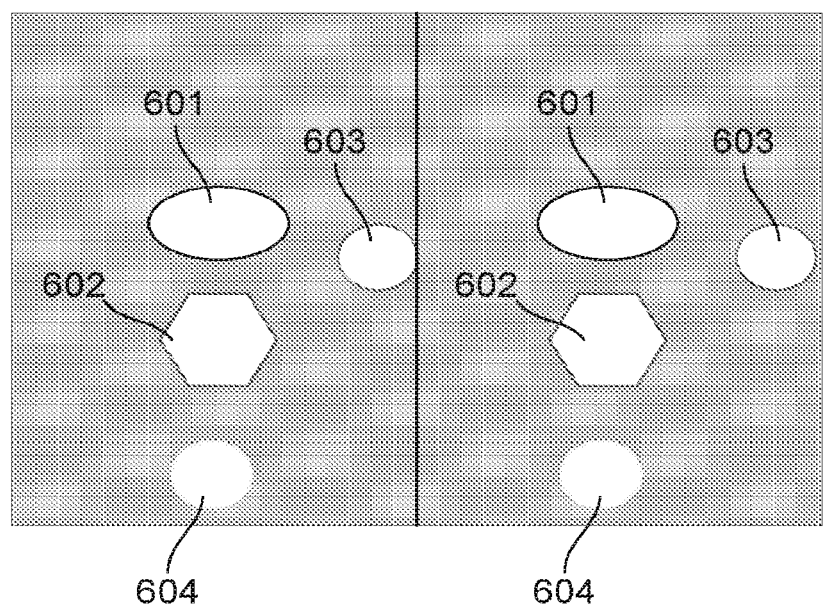

In this example, the fifth boundary region 605 falls inside the third display region and hence cannot be displayed, and will simply be omitted. The third and fourth boundary regions 603, 604 fall within the second display region 612. However the third boundary region falls within the second gaze region, whilst the fourth boundary region falls within the third gaze region, meaning the fourth boundary region 604 has a higher relative degree of compression that the third boundary region 603. For similar reasons the first boundary region has a lower degree of compression than the second boundary region 602, meaning the degree of compression will progressively increase for the each of the first, second, third and fourth boundary regions, as shown by the degree of line weight in FIG. 6E.

At step 442, having determined relative compressions, the processing system 310 determines a target compression based on the wireless communications link data, using this to determine absolute compression amounts for each of the four boundary regions at step 446, which is in turn used to select compression schemes and/or compression scheme parameters for each boundary.

Simultaneously with these processes, the content engine renders the image at step 448, providing the completed image at step 450.

At step 452, the encoder 320 then encodes image data within the boundaries in accordance with the respective encoding scheme. The resulting encoded image data is then combined with the generated boundary data to form compressed image data, which is then transmitted to the display device at step 454. In this regard, it will be noted that if a new boundary is not created, the boundary data will simply specify that an estimated boundary is to be used.

Whilst the image data is being compressed, the display device 340 can determine a change in display device pose, again by comparing a current pose to a previous pose at step 456 and determining field of view change at step 458, based on user input commands. This can be used to estimate boundaries at step 460 and to determine a gaze, depth and direction, which is in turn used to calculate a gaze map at step 462. A configuration map is also retrieved at step 464. It will be appreciated that these processes can be performed in parallel with the creation of the compressed image data, so that they are completed prior to receipt of the compressed image data.

When the compressed image data is received, the decoder 330 determines boundary data at step 466, allowing the decoder 330 to determine whether the estimated boundaries or a recalculated boundary should be used. The relevant boundary is selected at step 468 with an encoding scheme for each boundary region being determined at step 470. It will be appreciated that this can be achieved using an analogous process to calculation of the absolute compression for each boundary. Specifically, this can use the gaze map and configuration map, and information regarding relative content compression provided with the boundary data, and the target compression derived from the communications link data, using this to determine which encoding scheme was used for each boundary region. Image data within each boundary area is decoded by the decoder 330 at step 472, with image data outside the boundary being created at step 474 allowing the image to be displayed at step 476.

It will be appreciated that in an example in which the boundary check is not performed prior to compression of the image data the boundary check can be alternatively performed whilst the display device is decompressing the received image data but before the next image data is generated.

In any event, the above described processes allow for significant digital content compression, without adversely effecting latency, allowing for the techniques to be used in providing wireless connections to virtual or augmented reality wearable displays using existing hardware, whilst also allowing for improved image compression to be achieved more broadly in other applications.

In one example, this is achieved as part of a full-loop style compression, in which information regarding the display device, such as the display device pose, is used in order to optimise content creation and/or compression. In one example, this can be achieved using a system including:

Software running on a PC/Server
Game engine and content generation software
Compression software on a SOC
De-compression software on a SOC
Compression/decompression running on OS/GPU, DSP, or other optional platforms
HMD or display device.

Taking advantage of this full loop, means that the whole interface eco-system could be exploited for greater reduction in data that needs to be transmitted. In particular this can be achieved using any one or more of the techniques outlined herein, including:

Tracking a user gaze
Tracking an area of interest in the content
Foveated compression based on a lens property and/or field-of-view of the display
Isolation of Virtual Objects within the frame
Detail areas, (faces etc)
Tracking audibly cued focus areas
Content interactions in scene mapping & future estimation
Jump-block compression & block grouping strategies
Dynamic frame-rate
Scene mapping, scene property interaction estimation.

Some of these variables isolate an object from a blank background and serve to mask that object out completely, to avoid needing to send the entire frame of redundant black or alpha channel pixels, whilst others create a mask around objects of interest like faces, audible attention cues, or content interactions.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

It must be noted that, as used in the specification and the appended claims, the singular forms "a," "an," and "the" include plural referents unless the context clearly dictates otherwise. Thus, for example, reference to "a processing system" includes a plurality of processing systems. In this specification and in the claims that follow, reference will be made to a number of terms that shall be defined to have the following meanings unless a contrary intention is apparent.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method of displaying images forming part of a digital reality stream, the method including, for each image to be displayed:
  a) in one or more encoder processing devices, generating compressed image data by differentially compressing image data indicative of the image in accordance with:
    i) system operation and the content of the digital reality stream so that different parts of the image are compressed using a different degree of compression; and,
    ii) communications link data indicative of operation of the wireless communications link;
    iii) wherein compressing the image data comprises:
      (1) obtaining pixel data from the image data, the pixel data representing an array of pixels within the image;
      (2) applying a transformation to the pixel data to determine a set of frequency coefficients indicative of frequency components of the array of pixels;
      (3) selectively encoding at least some of the frequency coefficients using a bit encoding scheme to thereby generate a set of encoded frequency coefficients; and,
      (4) generating the compressed image data using the encoded frequency coefficients;
  b) wirelessly transmitting the compressed image data to a display device using a wireless communications link; and, c) in one or more decoder processing devices associated with the display device, differentially decompressing the compressed image data to thereby generate image data indicative of the image to be displayed wherein the compressed image data is differentially decompressed in accordance with the communications link data;
d) wherein decompressing the compressed image data comprises:
   i) determining a set of encoded frequency coefficients from the compressed image data in accordance with the bit encoding scheme;
   ii) performing bit decoding of the encoded frequency coefficients in accordance with the bit encoding scheme to thereby generate a set of frequency coefficients; and,
   iii) applying an inverse transformation to the set of frequency coefficients to determine pixel data representing an array of pixels within the one or more images and wherein the bit encoding scheme defines the number of bits used to encode each of the frequency coefficients, and wherein the frequency coefficients are selectively encoded so that at least one of:
      (1) frequency coefficients having a higher magnitude are encoded;
      (2) at least some of the encoded frequency coefficients have different numbers of bits;
      (3) a smaller number of bits are used to encode frequency coefficients corresponding to higher frequencies;
      (4) a progressively smaller number of bits are used to encode frequency coefficients corresponding to progressively higher frequencies;
      (5) at least one frequency coefficient is discarded so that the set of encoded frequency coefficients is smaller than the set of frequency coefficients; and,
      (6) at least one frequency coefficient is discarded corresponding to higher frequencies.

2. A method according to claim 1, wherein the method includes:
   a) differentially compressing the image data by discarding image data for at least some of the image; and,
   b) differentially decompressing the compressed image data by recreating image data for at least some of the image using at least one of:
      i) image data for a corresponding part of a previous image; and,
      ii) using defined image data.

3. A method according to claim 1, wherein the method includes:
   a) differentially compressing the image data in accordance with at least one of:
      i) display data at least partially indicative of at least one of:
         (1) operation of the display device;
         (2) use of the display device; and,
      ii) configuration data at least partially indicative of a configuration of the display device; and,
      iii) content data at least partially indicative of the digital reality content; and,
   b) differentially decompressing the compressed image data in accordance with at least one of:
      i) the display data;
      ii) the configuration data; and,
      iii) compression data indicative of the differential compression.

4. A method according to claim 3, wherein the method includes:
   a) determining a target compression using the communications link data;
   b) determining a relative degree of compression for each of a number of areas of interest based on at least one of:
      i) the configuration data;
      ii) the display data; and,
      iii) the content data;
   c) determining an absolute degree of compression for each of area of interest based on the relative degree of compression and the overall degree of compression required; and,
   d) compressing the image data using the absolute degree of compression for each area of interest.

5. A method according to claim 4, wherein the method includes:
   a) determining the location of an area of interest using at least one of:
      i) the display data; and,
      ii) the content data; and,
   b) determining the relative degree of compression for an area of interest based on the location and at least one of:
      i) content associated with the areas of interest;
      ii) a configuration map defining relative degrees of compression for the display device; and,
      iii) a gaze map defining relative degrees of compression for the user gaze.

6. A method according to claim 1, wherein the method includes:
   a) in the one or more decoder processing devices associated with the display device:
      i) generating display data by analysing signals from one or more on-board sensors, wherein the display data is indicative of at least one of:
         (1) pose data indicative of a display device pose relative to the environment;
         (2) movement data indicative of a display device movement relative to the environment;
         (3) input commands provided by a user;
         (4) gaze data indicative of a user gaze; and,
         (5) physiological data indicative of a physiological attribute of the user;
      ii) locally storing the display data; and,
      iii) wirelessly transmitting the display data to the one or more encoder processing devices;
   b) in the one or more encoder processing devices:
      i) differentially compressing the image data in accordance with received display data; and,
      ii) wirelessly transmitting the compressed image data to the display device; and,
   c) in the one or more decoder processing devices associated with the display device, decompressing received compressed image data in accordance with stored display data.

7. A method according to claim 6, wherein the method includes:
   a) determining a change in display device pose from display of a previous image using at least one of:
      i) movement data; and,
      ii) pose data and previous pose data; and,
   b) using the change in display device pose to at least one of compress image data and decompress the compressed image data by
      i) retrieving previous image data for a previous image;
      ii) determining redundancy between the image and the previous image; and, iii) using the redundancy to at least one of:
   (1) compress image data; and,
   (2) decompress the compressed image data.

8. A method according to claim 6, wherein the method includes:
   a) determining a user gaze including a depth of gaze;
   b) using a depth of field of part of the image and the depth of gaze to at least one of:
      i) compress image data for the part of the image; and,
      ii) decompress the compressed image data for the part of the image.

9. A method according to claim 1, wherein the method includes:
   a) in the one or more encoder processing devices:
      i) differentially compressing the image data in accordance with content data, wherein the content data includes at least one of:
         (1) pixel array content;
         (2) image content;
         (3) content of different parts of the image;
         (4) an opacity of different parts of the image;
         (5) areas of interest within the image;
         (6) locations of interest within the image;
         (7) one or more cues associated with the image; and,
         (8) one or more display objects within the image; and,
      ii) generating compression data indicative of the differential compression, wherein the compression data includes at least one of:
         (1) boundary data indicative of a boundary encompassing one or more display objects;
         (2) block data indicative of a block of pixel arrays;
         (3) opacity data indicative of an opacity of different parts of the image; and,
   b) location markers indicative of a location of interest; wirelessly transmitting the compression data to the display device; and,
   c) in the one or more decoder processing devices associated with the display device decompressing the compressed image data in accordance with the compression data to thereby generate the image to be displayed.

10. A method according to claim 1, wherein the method includes:
    a) in the one or more encoder processing devices:
       i) generating a boundary;
       ii) differentially compressing the image data in accordance with the boundary by selecting a respective compression scheme to compress image data within the boundary; and,
       iii) generating boundary data indicative of the boundary and in accordance with the selected compression scheme;
    b) wirelessly transmitting the boundary data to the display device; and,
    c) in the one or more decoder processing devices associated with the display device decompressing the compressed image data in accordance with the boundary data to thereby generate the image to be displayed by:
       i) determining the selected compression scheme in accordance with the boundary data; and,
       ii) using a corresponding decompression scheme to decompress the compressed image data.

11. A method according to claim 10, wherein at least one of:
    a) the boundary data is indicative of at least one of:
       i) a boundary extent, including at least one of:
          (1) one or more boundary vertices;
          (2) a boundary shape; and,
          (3) a boundary location;
       ii) a change in boundary extent compared to a previous boundary for a previous image; and,
       iii) an indication that an estimated boundary should be used;
       iv) an indication that an estimated boundary should be used;
    b) the method includes, in the one or more encoder processing devices, generating a boundary by at least one of:
       i) calculating a boundary using the content data; and,
       ii) estimating a change in boundary using the display data;
    c) the method includes, in the one or more encoder processing devices, calculating a boundary by:
       i) identifying one or more parts the image from the content data, wherein the one or more parts encompass one or more display objects within the image; and,
       ii) calculating at least one boundary encompassing the one or more parts; and,
    d) the method includes calculating the boundary so that the number of bits required to encode the boundary and encoded image data are minimised.

12. A method according to claim 10, wherein the method includes:
    a) in the one or more encoder processing devices:
       i) retrieving previous boundary data indicative of a previous boundary for a previous image;
       ii) determining a change in boundary extent using the previous boundary data; and,
       iii) generating the boundary data using the change in boundary extent; and,
    b) in the one or more decoder processing devices:
       i) retrieving previous boundary data indicative of a previous boundary for a previous image;
       ii) determining a change in boundary from the boundary data; and,
       iii) using the previous boundary and the change in boundary extent to calculate a boundary extent.

13. A method according to claim 10, wherein the method includes at least one of:
    a) in the one or more encoder processing devices:
       i) for every $n^{th}$ image in a sequence of images, assessing an estimated boundary using at least one of:
          (1) a calculated boundary; and,
          (2) the content data; and,
       ii) selectively re-calculating a boundary depending on results of the comparison; and,
    b) in the one or more decoder processing devices associated with the display device:
       i) determining an estimated boundary is to be used from the boundary data; and,
       ii) estimating a boundary using the display data using at least one of:
          (1) a change in display device pose; and,
          (2) a field of view change.

14. A method according to claim 1, wherein the method includes:
    a) in the one or more encoder processing devices, compressing at least part of the image data by:

i) obtaining pixel data from the image data, the pixel data representing pixel arrays from within an image;

ii) identifying a pixel block including a number of pixel arrays having a substantially similar pixel array content; and, iii) generating compression data including block data indicative of:
(1) a first pixel array location;
(2) an end pixel array location; and,
(3) the pixel array content; and, b) in the one or more decoder processing devices associated with the display device, decompressing at least part of the compressed image data by:

i) determining from block data:
(1) a first pixel array location;
(2) an end pixel array location; and,
(3) pixel array content, ii) generating a pixel block including a number of pixel arrays having a substantially similar pixel array content using the block parameters; and, iii) generating image data at least in part using the pixel block.

15. A method according to claim 1, wherein the method includes determining the configuration data indicative of a display device configuration by at least one of:

a) retrieving the configuration data using a display device identifier, the display device configuration including at least one of:
i) a display resolution;
ii) a display refresh rate;
iii) a display field of view; and,
iv) display lens attributes; and, b) wirelessly exchanging the configuration data between the display device and one or more encoder processing devices.

16. A method according to claim 1, wherein the method includes determining communications link data indicative of operation of a wireless communications link at least one of:
a) from wireless communications link hardware;
b) in the one or more decoder processing devices associated with the display device and one or more encoder processing devices independently; and,
c) by exchanging the communications link data between the display device and one or more encoder processing devices and wherein the communications link data is indicative of at least one of:
i) a wireless communications link error metrics;
ii) a wireless communications link quality of service;
iii) a wireless communications link bandwidth; and,
iv) a wireless communications link latency.

17. A system for displaying images forming part of a digital reality stream, the system including:
a) one or more encoder processing devices that generate compressed image data by differentially compressing image data indicative of the image in accordance with:
i) system operation and the content of the digital reality stream so that different parts of the image are compressed using a different degree of compression; and,
ii) communications link data indicative of operation of the wireless communications link;
iii) wherein compressing the image data by the one or more encoder processing devices comprises:
(1) obtaining pixel data from the image data, the pixel data representing an array of pixels within the image;
(2) applying a transformation to the pixel data to determine a set of frequency coefficients indicative of frequency components of the array of pixels;
(3) selectively encoding at least some of the frequency coefficients using a bit encoding scheme to thereby generate a set of encoded frequency coefficients; and
(4) generating the compressed image data using the encoded frequency coefficients;

b) a wireless communications link that wirelessly transmits the compressed image data; and, c) one or more decoder processing devices associated with a display device that decompress the compressed image data to thereby generate image data indicative of the image to be displayed wherein the compressed image data is differentially decompressed in accordance with the communications link data;

d) wherein decompressing the compressed image data by the one or more decoder processing devices comprises:
i) determining a set of encoded frequency coefficients from the compressed image data in accordance with the bit encoding scheme;
ii) performing bit decoding of the encoded frequency coefficients in accordance with the bit encoding scheme to thereby generate a set of frequency coefficients; and,
iii) applying an inverse transformation to the set of frequency coefficients to determine pixel data representing an array of pixels within the one or more images and wherein the bit encoding scheme defines the number of bits used to encode each of the frequency coefficients, and wherein the frequency coefficients are selectively encoded so that at least one of:
(1) frequency coefficients having a higher magnitude are encoded;
(2) at least some of the encoded frequency coefficients have different numbers of bits;
(3) a smaller number of bits are used to encode frequency coefficients corresponding to higher frequencies;
(4) a progressively smaller number of bits are used to encode frequency coefficients corresponding to progressively higher frequencies;
(5) at least one frequency coefficient is discarded so that the set of encoded frequency coefficients is smaller than the set of frequency coefficients; and,
(6) at least one frequency coefficient is discarded corresponding to higher frequencies.

18. A system according to claim 17, wherein at least one of the display device and an encoder include a memory that stores at least one of:
a) configuration data indicative of a display device configuration;
b) boundary data indicative of a defined boundary associated with the display device;
c) previous boundary data indicative of a previous boundary for a previous image;
d) previous pose data indicative of a previous display device pose; and,
e) previous image data indicative of a previous image.

19. A system according to claim 17, wherein the system includes a decoder in wireless communication with an encoder to exchange at least one of:
   a) compressed image data;
   b) display data at least partially indicative of at least one of:
      i) operation of the display device; and,
      ii) use of the display device;
   c) configuration data at least partially indicative of a configuration of the display device;
   d) content data at least partially indicative of the digital reality content; and,
   e) compression data indicative of the differential compression, and wherein the decoder is at least one of:
      i) coupled to a wearable display device;
      ii) part of a wearable display device; and,
      iii) an embedded system within a client device.

* * * * *